(12) United States Patent
Zhang et al.

(10) Patent No.: US 12,294,744 B2
(45) Date of Patent: May 6, 2025

(54) VIDEO STREAM PROCESSING METHOD AND APPARATUS, DEVICE, AND MEDIUM

(71) Applicant: HUAWEI TECHNOLOGIES CO., LTD., Guangdong (CN)

(72) Inventors: Xingshi Zhang, Shenzhen (CN); Ya Chang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 366 days.

(21) Appl. No.: 17/851,856

(22) Filed: Jun. 28, 2022

(65) Prior Publication Data

US 2022/0329880 A1 Oct. 13, 2022

Related U.S. Application Data

(63) Continuation of application No. PCT/CN2019/129847, filed on Dec. 30, 2019.

(51) Int. Cl.
*G06V 10/82* (2022.01)
*G06T 7/50* (2017.01)
(Continued)

(52) U.S. Cl.
CPC ......... *H04N 21/21805* (2013.01); *G06T 7/50* (2017.01); *G06T 7/70* (2017.01);
(Continued)

(58) Field of Classification Search
CPC ........... H04N 21/21805; H04N 13/117; H04N 21/437; H04N 21/472; H04N 21/8549; H04N 2013/0081; H04N 21/234; H04N 21/251; H04N 21/42204; H04N 21/4728; H04N 21/6587; H04N 21/816; H04N 21/4223; H04N 21/44218; H04N 21/6437;
(Continued)

(56) References Cited

U.S. PATENT DOCUMENTS

| | | | |
|---|---|---|---|
| 2005/0129325 A1* | 6/2005 | Wu | H04N 7/144 382/254 |
| 2014/0038708 A1* | 2/2014 | Davison | A63F 13/69 463/31 |

(Continued)

FOREIGN PATENT DOCUMENTS

| | | |
|---|---|---|
| CN | 102186038 A | 9/2011 |
| CN | 106162137 A | 11/2016 |

(Continued)

*Primary Examiner* — Nimesh Patel

(57) ABSTRACT

A video stream processing method and apparatus are provided. The method includes obtaining an image set of a target person from a multi-channel video stream, the multi-channel video stream being obtained for a same scene by a plurality of cameras, and an image in the image set includes a front face image of the target person; determining a virtual viewpoint in a target-person view mode based on the image in the image set; and projecting, based on a depth map of a target image and a pose of a real viewpoint corresponding to the target image, the target image onto an imaging plane corresponding to the virtual viewpoint to obtain a video stream in the target-person view mode, the target image intersecting with a vision field of the target person in the multi-channel video stream.

24 Claims, 10 Drawing Sheets

S202 — Obtain an image set of a target person from a multi-channel video stream

S204 — Determine a virtual viewpoint in a target-person view mode based on at least one frame of image in the image set of the target person S206 — Project, based on a depth map of a target image and a pose of a real viewpoint corresponding to the target image, the target image onto an imaging plane corresponding to the virtual viewpoint, to obtain a video stream in the target-person view mode

(51) Int. Cl.
| | |
|---|---|
| *G06T 7/70* | (2017.01) |
| *G06V 10/762* | (2022.01) |
| *G06V 40/16* | (2022.01) |
| *G06V 40/18* | (2022.01) |
| *H04N 13/117* | (2018.01) |
| *H04N 21/218* | (2011.01) |
| *H04N 21/437* | (2011.01) |
| *H04N 21/472* | (2011.01) |
| *H04N 21/8549* | (2011.01) |
| *H04N 13/00* | (2018.01) |

(52) U.S. Cl.
CPC ............ *G06V 10/762* (2022.01); *G06V 10/82* (2022.01); *G06V 40/161* (2022.01); *G06V 40/18* (2022.01); *H04N 13/117* (2018.05); *H04N 21/437* (2013.01); *H04N 21/472* (2013.01); *H04N 21/8549* (2013.01); *G06T 2207/10016* (2013.01); *G06T 2207/20068* (2013.01); *G06T 2207/20084* (2013.01); *G06T 2207/30201* (2013.01); *H04N 2013/0081* (2013.01)

(58) Field of Classification Search
CPC .... H04N 13/239; H04N 23/66; H04N 19/597; H04N 23/90; H04N 23/61; H04N 23/959; H04N 13/243; H04N 23/667; H04N 13/344; H04N 13/279; H04N 13/332; H04N 13/366; H04N 23/69; H04N 23/80; H04N 13/20; H04N 13/289; H04N 13/383; H04N 13/204; H04N 13/282; H04N 13/158; H04N 21/8146; H04N 13/395; H04N 5/226; G06T 7/50; G06T 7/70; G06T 2207/10016; G06T 2207/20068; G06T 2207/20084; G06T 2207/30201; G06T 15/205; G06T 19/006; G06T 2207/10028; G06T 19/00; G06T 19/003; G06T 7/55; G06T 17/00; G06T 19/20; G06T 2207/20081; G06T 11/00; G06T 13/80; G06T 17/05; G06T 2207/10012; G06T 2207/10021; G06T 2207/10024; G06T 2207/20221; G06T 2207/30244; G06T 2219/028; G06T 2219/2016; G06T 5/50; G06T 7/20; G06T 7/579; G06T 7/73; G06T 7/80; G06V 10/762; G06V 10/82; G06V 40/161; G06V 40/18; G06V 40/165; G06V 40/166; G06V 40/19; G06V 40/193; G06V 20/20; G06V 40/172; G06V 10/443; G06V 10/245; G06V 20/58; G06V 40/168; G06V 10/255; G06V 10/70; G06V 10/764; G06V 10/806; G06V 20/52; G06V 20/64; G06V 20/653; G06V 40/107; G06V 40/173; G06V 40/40; G06V 40/171; G06V 40/169; G06V 40/20; G06V 2201/12; G06V 40/197; G06V 20/647; G06V 40/174; G06V 10/25; G06V 40/10; G02B 27/0093; G02B 2027/0138; G02B 27/0172; G02B 27/00178; G02B 27/017; G02B 2027/0134; G02B 27/0179; G02B 2027/0105; G02B 27/0103; G02B 27/01; G02B 2027/0185; G02B 30/34; G06F 3/011; G06F 3/013; G06F 3/012; G06F 1/163; G06F 21/32; G06F 16/29; G06F 18/23; G06F 18/24; G06F 18/2411; G06F 18/2413; G06F 18/25; G06F 18/253; G06F 2221/2133; G06F 3/017; G06F 1/3231; G01S 13/878; G01S 15/08; G01S 15/42; G01S 17/08; G01S 2013/468; G01S 17/06; G01S 17/89; G01S 19/42; G06N 3/08; G06N 3/045; G06N 20/00; G06N 3/02; G06N 3/04; G06N 3/044; G06N 20/10; G06N 3/048; G06N 3/088; A61B 34/25; A61B 90/361; A61B 2017/00212; A61B 2017/00216; A61B 2090/367; A61B 2090/372; A61B 2090/061; A61B 2090/371; A61B 2090/373; A61B 90/06; A61B 34/10; A61B 2090/3937; A63F 13/213; A63F 2300/8082; A63F 13/65; A63F 13/211; A63F 13/25; A63F 13/212; A63F 13/5255; A63F 13/216; A63F 13/50; A63F 13/5252; A63F 13/86
See application file for complete search history.

(56) References Cited

U.S. PATENT DOCUMENTS

| | | | |
|---|---|---|---|
| 2014/0368495 A1 | 12/2014 | Wei et al. | |
| 2014/0368621 A1* | 12/2014 | Michiyama | H04N 13/156 348/50 |
| 2016/0343138 A1* | 11/2016 | Chew | G06T 7/73 |
| 2017/0018088 A1* | 1/2017 | Jeong | G06T 7/74 |
| 2017/0124385 A1* | 5/2017 | Ganong | G06F 16/50 |
| 2017/0238055 A1* | 8/2017 | Chang | G06V 20/42 725/19 |
| 2018/0081427 A1* | 3/2018 | Siddiqui | G06F 3/013 |

FOREIGN PATENT DOCUMENTS

| | | |
|---|---|---|
| CN | 106254916 A | 12/2016 |
| CN | 107155101 A | 9/2017 |
| CN | 107809630 A | 3/2018 |
| CN | 108376424 A | 8/2018 |
| CN | 108696764 A | 10/2018 |
| CN | 108737724 A | 11/2018 |
| CN | 108900857 A | 11/2018 |
| CN | 109407828 A | 3/2019 |
| CN | 109561296 A | 4/2019 |
| CN | 109644265 A | 4/2019 |
| CN | 109712067 A | 5/2019 |
| CN | 110073662 A | 7/2019 |
| EP | 2150065 A2 | 2/2010 |
| JP | 2004152133 A | 5/2004 |
| JP | 2018107793 A | 7/2018 |
| JP | 2019140483 A | 8/2019 |
| WO | 2018057947 A1 | 3/2018 |

* cited by examiner

VIDEO STREAM PROCESSING METHOD AND APPARATUS, DEVICE, AND MEDIUM

CROSS-REFERENCE TO RELATED APPLICATIONS

This application is a continuation of International Application No. PCT/CN2019/129847, filed on Dec. 30, 2019, the disclosure of which is hereby incorporated by reference in its entirety.

TECHNICAL FIELD

This embodiment of this application relates to the field of artificial intelligence (AI) technologies, and in particular, to a video stream processing method and apparatus, a device, and a computer-readable storage medium.

BACKGROUND

With development of communications technologies, a transmission rate and a capacity of a communications network continuously increase, and some interaction manners that cannot be used due to a bandwidth limitation are applied in practice. For example, in a video application scenario, especially in a live broadcast scenario, a video platform may simultaneously transmit, to a user terminal, a multi-channel video stream generated by a plurality of synchronous cameras through shooting at different angles of view, and a user may switch between video streams at the different angles of view on the terminal side, to obtain better interaction experience.

Currently, the industry provides a multi-channel video stream processing solution based on a point cloud technology. The solution is: shooting a scene by using dozens of high-definition cameras, and then reconstructing the scene by using the point cloud technology based on a multi-channel video stream obtained through shooting, so that a user can watch the scene at a plurality of different angles of view.

However, for the point cloud technology, an ultra-large quantity of computing resources need to be consumed, a short moment usually requires more than 10 minutes for rendering, and it is difficult to meet a requirement of a service such as live broadcast. In addition, the plurality of angles of view provided in this solution are still a third-person view. Consequently, an interaction effect is poor.

SUMMARY

This embodiment of this application provides a video stream processing method, to resolve a problem that in an existing video stream processing method, an ultra-large quantity of computing resources need to be consumed and a long time is required for rendering, it is difficult to meet a requirement of a service such as live broadcast, and a plurality of processed angles of view are still a third-person view, resulting in a poor interaction effect. This embodiment of this application further provides a corresponding video stream processing apparatus, a device, a computer-readable storage medium, and a computer program product.

According to a first aspect, this embodiment of this application provides a video stream processing method. The method may be applied to a server or a server cluster. For ease of description, the server is used as an example for description. A plurality of cameras may shoot a same scene, such as a game scene or a recreational activity scene, to obtain a multi-channel video stream. The server obtains the multi-channel video stream, and obtains an image set of a target person from the multi-channel video stream, where an image in the image set includes a front face of the target person. Then, the server determines a virtual viewpoint in a target-person view mode based on the image in the image set; and then projects, based on a depth map of an image (which is referred to as a target image below) that has an intersection with a vision view of the target person in the multi-channel video stream and a pose of a real viewpoint corresponding to the target image, the target image onto an imaging plane corresponding to the virtual viewpoint, to obtain a video stream in the target-person view mode.

Only the image that has the intersection with the vision field of the target person needs to be processed, so that a calculation amount is greatly reduced, a large quantity of computing resources do not need to be consumed and a long time is not required for rendering, and a requirement of a service such as live broadcasting can be met. In addition, a video stream in a third-person view mode can be converted into the video stream in the target-person view mode (which is a first-person view mode), so that a sense of substitution can be improved and a good interaction effect is achieved.

With reference to the first aspect, in a first implementation of the first aspect, the server may determine the virtual viewpoint in the target-person view mode through pupil recognition. A pupil of the target person can be identified for the image in the image set. The server may perform face angle estimation and pupil location estimation on at least one frame of image in the image set, to determine angles of the virtual viewpoint in the target-person view mode in a world coordinate system; and determine a distance from the virtual viewpoint in the target-person view mode to an origin of the world coordinate system based on a depth map corresponding to the at least one frame of image. In this way, the server determines the virtual viewpoint in the target-person view mode. This method can locate the virtual viewpoint quickly and accurately, to help improve video stream processing efficiency and accuracy.

With reference to the first implementation of the first aspect, in a second implementation of the first aspect, the server may first determine an eye area of the target person in the at least one frame of image in the image set through face alignment, to obtain an eye image; and perform pupil location recognition on the eye image of the target person by using a pre-trained deep neural network, to determine the virtual viewpoint based on a recognized pupil location.

With reference to the first aspect, in a third implementation of the first aspect, the server may first backproject the image onto three-dimensional space, and then project the image from the three-dimensional space onto the imaging plane corresponding to the virtual viewpoint, to implement view mode conversion of a video stream.

The server determines a first projection matrix based on the pose of the real viewpoint corresponding to the target image; backprojects the target image onto the three-dimensional space, for example, a world coordinate system, based on the first projection matrix and the depth map of the target image; then determines a second projection matrix based on a pose of the virtual viewpoint; and projects, based on the second projection matrix, pixels in the three-dimensional space onto the imaging plane corresponding to the virtual viewpoint.

With reference to the first aspect, in a fourth implementation of the first aspect, according to the following formulas, the server may backproject the target image onto the three-dimensional space, and project the pixels in the three-dimensional space onto the imaging plane corresponding to the virtual viewpoint.

The server determines, according to the following formula sm(u,v)=PM(X,Y,Z), a point M(X, Y, Z) to which a point m(u, v) in the target image is mapped in a world coordinate system.

Herein, s is a shrinkage factor, P is the first projection matrix, and Z in M(X, Y, Z) is determined based on the depth map.

The server determines, according to the following formula, a point m'(u,v) to which the point M(X,Y,Z) in the world coordinate system is mapped on the imaging plane corresponding to the virtual viewpoint:

$$sm'(u,v)=P_v M(X,Y,Z)$$

Herein, $P_v$ is the second projection matrix.

With reference to any one of the first aspect or the first implementation to the fourth implementation of the first aspect, in a fifth implementation of the first aspect, the server may decode the multi-channel video stream to obtain an image frame sequence corresponding to at least one channel of video stream; and perform face detection on at least one frame of image in the image frame sequence, then perform clustering on a face of a same person, and select an image including a front face from clustered images to obtain the image set of the target person.

With reference to any one of the first aspect or the first implementation to the fourth implementation of the first aspect, in a sixth implementation of the first aspect, the server may determine, as the target person, a person specified by a user, or determine, as the target person, a person whose appearance frequency is higher than a preset frequency. In this way, computing resource consumption is reduced when a user requirement is met.

With reference to any one of the first aspect or the first implementation to the fourth implementation of the first aspect, in a seventh implementation of the first aspect, the server may send the video stream in the target-person view mode to a user terminal in response to a mode switching request sent by the user terminal.

According to a second aspect, this embodiment of this application provides a video stream processing method. The method may be applied to a user terminal. The user terminal may be any user equipment such as a mobile phone, a computer, or a television. In an embodiment, the user terminal may send a mode switching request to a server, where the mode switching request carries an identifier of a target person, and the target person is a person included in a multi-channel video stream obtained by shooting a same scene by a plurality of cameras. The server may return a video stream in a target-person view mode to the user terminal, where the video stream in the target-person view mode is obtained by projecting, based on a depth map of a target image and a pose of a real viewpoint corresponding to the target image, an image (which is referred to as the target image below) that has an intersection with a vision field of the target person in the multi-channel video stream onto an imaging plane corresponding to a virtual viewpoint in the target-person view mode, where the virtual viewpoint is determined based on at least one frame of image in an image set that is of the target person and that is obtained from the multi-channel video stream, and the at least one frame of image in the image set includes a front face of the target person. Then, the user terminal plays the video stream in the target-person view mode. In this way, a user watches a video in the target-person view mode to obtain good interaction experience.

With reference to the second aspect, in a first implementation of the second aspect, the user terminal may further receive a video stream that is in an associated-person view mode and that is returned by the server, where an associated person is a person that has an association relationship with the target person in the multi-channel video stream. For example, in a live football game scenario, when a target person is a striker, an associated person of the target person may be a defensive player or a goalkeeper of the other party. In some cases, for example, when a dispute occurs, the associated person may also be a referee or the like.

Correspondingly, the user terminal plays both the video stream in the target-person view mode and the video stream in the associated-person view mode. For example, the video stream in the target-person view mode may be played in parallel through a plurality of windows, or the video stream in the associated-person view mode may be played in a form of a small window in a playing window corresponding to the target-person view mode. In this way, the user can obtain richer information based on the video stream in the target-person view mode and the video stream in the associated-person view mode, to further improve user experience.

With reference to the second aspect or the first implementation of the second aspect, in a second implementation of the second aspect, the user may trigger a mode switching operation in any one of a plurality of manners such as remote control, touch, voice control, or gesture control.

Correspondingly, the user terminal may generate the mode switching request in response to a mode switching operation triggered by the user by using a remote control device, or generate the mode switching request in response to a mode switching operation triggered by the user by touching or tapping a mode switching control, or generate the mode switching request in response to a mode switching operation triggered by the user by using a voice or a gesture.

With reference to the second aspect or the first implementation of the second aspect, in a second implementation of the second aspect, the user terminal may further display, in a video stream playing interface, a video synopsis that corresponds to the video stream in the target-person view mode and that is pushed by the server. The user terminal may generate the mode switching request in response to a trigger operation performed on the video synopsis, to switch from a third-person view mode to the target-person view mode.

According to a third aspect, this embodiment of this application provides a video stream processing apparatus. The apparatus includes:
  a communications module, configured to obtain a multi-channel video stream, where the multi-channel video stream is obtained by shooting a same scene by a plurality of cameras;
  a positioning module, configured to: obtain an image set of a target person from the multi-channel video stream, and determine a virtual viewpoint in a target-person view mode based on the image set, where an image in the image set includes a front face of the target person; and
  a projection module, configured to project, based on a depth map of a target image and a pose of a real viewpoint corresponding to the target image, the target image onto an imaging plane corresponding to the virtual viewpoint, to obtain a video stream in the target-person view mode, where the target image is an image that has an intersection with a vision field of the target person in the multi-channel video stream.

With reference to the third aspect, in a first implementation of the third aspect, the positioning module is configured to:

perform face angle estimation and pupil location estimation on at least one frame of image in the image set, to determine angles of the virtual viewpoint in the target-person view mode in a world coordinate system; and determine a distance from the virtual viewpoint in the target-person view mode to an origin of the world coordinate system based on a depth map corresponding to the at least one frame of image.

With reference to the first implementation of the third aspect, in a second implementation of the third aspect, the positioning module is configured to:

determine an eye area of the target person in the at least one frame of image in the image set through face alignment, to obtain an eye image; and perform pupil location recognition on the eye image of the target person by using a pre-trained deep neural network.

With reference to the third aspect, in a third implementation of the third aspect, the projection module is configured to:

determine a first projection matrix based on the pose of the real viewpoint corresponding to the target image;

backproject the target image onto three-dimensional space based on the first projection matrix and the depth map of the target image;

determine a second projection matrix based on a pose of the virtual viewpoint; and project, based on the second projection matrix, pixels in the three-dimensional space onto the imaging plane corresponding to the virtual viewpoint.

With reference to the third implementation of the third aspect, in a fourth implementation of the third aspect, the projection module is configured to:

determine, according to the following formula, a point M(X,Y,Z) to which a point m(u,v) in the target image is mapped in a world coordinate system:

$$sm(u,v)=PM(\ ), \text{ where}$$

s is a shrinkage factor, P is the first projection matrix, and Z in M(X,Y,Z) is determined based on the depth map; and determine, according to the following formula, a point m'(u,v) to which the point M(X,Y,Z) in the world coordinate system is mapped on the imaging plane corresponding to the virtual viewpoint:

$$sm'(u,v)=P_v M(X,Y,Z), \text{ where}$$

$P_v$ is the second projection matrix.

With reference to any one of the third aspect or the first implementation to the fourth implementation of the third aspect, in a fifth implementation of the third aspect, the positioning module is configured to:

decode the multi-channel video stream to obtain an image frame sequence corresponding to at least one channel of video stream; and perform face detection on at least one frame of image in the image frame sequence, then perform clustering on a face of a same person, and select an image including a front face from clustered images to obtain the image set of the target person.

With reference to any one of the third aspect or the first implementation to the fourth implementation of the third aspect, in a sixth implementation of the third aspect, the apparatus further includes:

a determining module, configured to: determine, as the target person, a person specified by a user, or determine, as the target person, a person whose appearance frequency is higher than a preset frequency.

With reference to any one of the third aspect or the first implementation to the fourth implementation of the third aspect, in a seventh implementation of the third aspect, the communications module is further configured to:

send the video stream in the target-person view mode to a user terminal in response to a mode switching request sent by the user terminal.

According to a fourth aspect, this embodiment of this application provides a video stream processing apparatus. The apparatus includes:

a communications module, configured to send a mode switching request to a server, where the mode switching request carries an identifier of a target person, and the target person is a person included in a multi-channel video stream obtained by shooting a same scene by a plurality of cameras, where the communications module is further configured to receive a video stream that is in a target-person view mode and that is returned by the server, where the video stream in the target-person view mode is obtained by projecting, based on a depth map of a target image and a pose of a real viewpoint corresponding to the target image, the target image onto an imaging plane corresponding to a virtual viewpoint in the target-person view mode, the target image is an image that has an intersection with a vision field of the target person in the multi-channel video stream, the virtual viewpoint is determined based on at least one frame of image in an image set that is of the target person and that is obtained from the multi-channel video stream, and the at least one frame of image in the image set includes a front face of the target person; and a playing module, configured to play the video stream in the target-person view mode.

With reference to the fourth aspect, in a first implementation of the fourth aspect, the communications module is further configured to:

receive a video stream that is in an associated-person view mode and that is returned by the server, where an associated person is a person that has an association relationship with the target person in the multi-channel video stream; and the playing module is configured to:

play the video stream in the target-person view mode and the video stream in the associated-person view mode.

With reference to the fourth aspect or the first implementation of the fourth aspect, in a second implementation of the fourth aspect, the apparatus further includes:

a generation module, configured to: generate the mode switching request in response to a mode switching operation triggered by a user by using a remote control device, or generate the mode switching request in response to a mode switching operation triggered by a user by touching or tapping a mode switching control, or generate the mode switching request in response to a mode switching operation triggered by a user by using a voice or a gesture.

With reference to the fourth aspect or the first implementation of the fourth aspect, in a third implementation of the fourth aspect, the apparatus further includes:

a display module, configured to display, in a video stream playing interface, a video synopsis that corresponds to the video stream in the target-person view mode and that is pushed by the server; and a generation module, configured to generate the mode switching request in response to a trigger operation performed on the video synopsis, to switch from a third-person view mode to the target-person view mode.

According to a fifth aspect, this embodiment of this application provides a device. The device includes a processor and a memory.

The memory is configured to store computer instructions.

The processor is configured to perform, according to the computer instructions, the video stream processing method according to the first aspect.

According to a sixth aspect, this embodiment of this application provides a device. The device includes a processor, a display, and a memory.

The memory is configured to store computer instructions.

The processor is configured to perform, by using the display according to the computer instructions, the video stream processing method according to the second aspect.

According to a seventh aspect, this embodiment of this application provides a computer-readable storage medium. The computer-readable storage medium stores instructions, and when the instructions are run on a computer, the computer is enabled to perform the video stream processing method according to the first aspect.

According to an eighth aspect, this embodiment of this application provides a computer-readable storage medium. The computer-readable storage medium stores instructions, and when the instructions are run on a computer, the computer is enabled to perform the video stream processing method according to the second aspect.

According to a ninth aspect, this embodiment of this application provides a computer program product including instructions. When the computer program product runs on a device, the device is enabled to perform the video stream processing method according to the first aspect.

According to a tenth aspect, this embodiment of this application provides a computer program product including instructions. When the computer program product runs on a device, the device is enabled to perform the video stream processing method according to the second aspect.

In this embodiment of this application, the implementations provided in the foregoing aspects can be further combined to provide more implementations.

DESCRIPTION OF EMBODIMENTS

This embodiment of this application provides a video stream processing method. In the method, a virtual viewpoint in a target-person view mode is determined based on an image including a front face of a target person in a multi-channel video stream, and then an image that has an intersection with a vision field of the target person in the multi-channel video stream is projected, based on a depth map and a pose of a real viewpoint, onto an imaging plane corresponding to the virtual viewpoint, to obtain a video stream in the target-person view mode. In this way, an audience can substitute for the target person in the video stream, to enhance a sense of interaction. In addition, when the video stream is converted, only the image that has the intersection with the vision field of the target person needs to be projected. This greatly reduces a quantity of images that need to be processed, improves conversion efficiency, and can meet a real-time service requirement.

The following describes the technical solutions in embodiments of this application with reference to the accompanying drawings in embodiments of this application.

Figure 1:
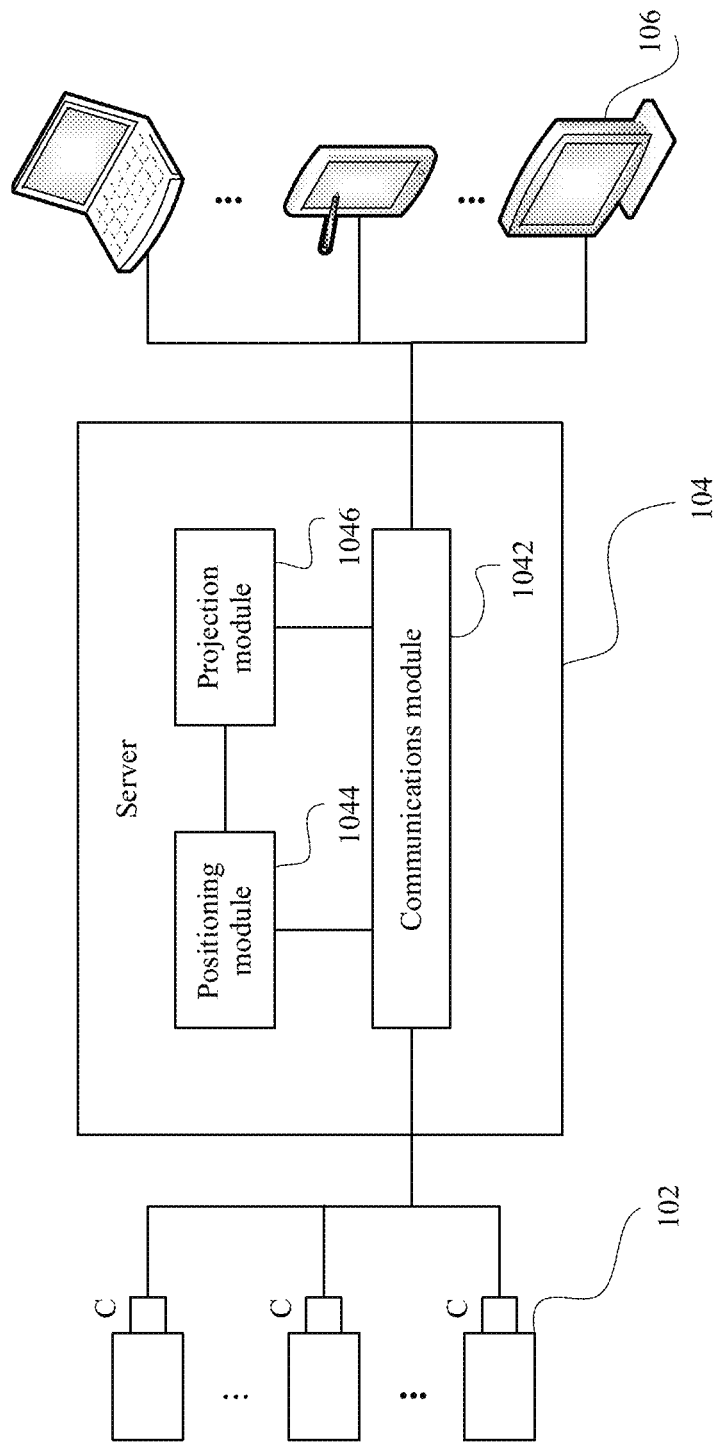
FIG. 1 is a diagram of a logical architecture of a video stream processing system according to this embodiment of this application.

FIG. 1 is a diagram of a logical architecture of a video stream processing system according to this embodiment of this application. As shown in the figure, the system includes a camera 102, a server 104, and a user terminal 106. The server 104 is connected to the camera 102 and the user terminal 106 through a network. The camera 102 includes a high-definition camera with resolution of 4K or higher. The high-definition camera collects an image of a large-scale activity scene such as a sports event or a cultural performance, to obtain a multi-channel video stream with high definition.

In consideration of a transmission rate and a network capacity, in actual embodiment of this application, a video stream may be transmitted through a 5th generation mobile communications network (5G). When the multi-channel video stream is transmitted to the server 104, the server may process the multi-channel video stream. The server converts the video stream from a third-person view mode (also referred to as a God mode) to a first-person view mode (that is, a view mode of a person in the video stream). In this way, video streams in a plurality of view modes may be provided for an audience.

The server 104 may include a communications module 1042, a positioning module 1044, and a projection module 1046. The communications module 1042 may obtain, from a plurality of cameras 102, a video stream obtained by shooting a scene by each camera 102, to obtain a multi-channel video stream. The positioning module 1044 may process the multi-channel video stream to determine a virtual viewpoint in a target-person view mode. For example, the positioning module 1044 may identify at least one frame of the image in the multi-channel video stream by using a facial recognition technology, obtain an image set of a target person based on an image including a front face of the target person, and then determine the virtual viewpoint in the target-person view mode based on at least one frame of image in the image set. The projection module 1046 projects, based on a depth map of a target image (that is, an image that has an intersection with a vision field of the target person in the multi-channel video stream) and a pose of a real viewpoint corresponding to the target image, the target image onto an imaging plane corresponding to the virtual viewpoint, to obtain a video stream in the target-person view mode.

The audience may trigger a mode selection operation by using the user terminal 106. In response to the mode selection operation, the user terminal 106 obtains a video stream in a corresponding mode from the server 104, and displays the video stream. When watching the video stream, the audience may further trigger a mode switching operation by using the user terminal 106. In response to the mode switching operation, the user terminal obtains, from the server 104, a video stream that matches a mode obtained after switching, to implement real-time switching of the view mode. The audience may watch a video in the third-person view mode, or may watch a video in the target-person view mode in the video stream at any time, to obtain better interaction experience.

In the embodiment shown in FIG. 1, the server 104 may be an independent server or a cloud server. In consideration of costs and a computing capability, the cloud server may be used in actual embodiment of this application. The user terminal 106 is any device that can play a video stream. In an example, the user terminal 106 includes but is not limited to a desktop computer, a notebook computer, a tablet computer, a mobile phone, or a television.

It should be noted that the system architecture shown in FIG. 1 is merely an example for better describing the system architecture provided in the video stream processing method provided in this embodiment of this application, and does not constitute a limitation on embodiments of this embodiment of this application.

Figure 2:
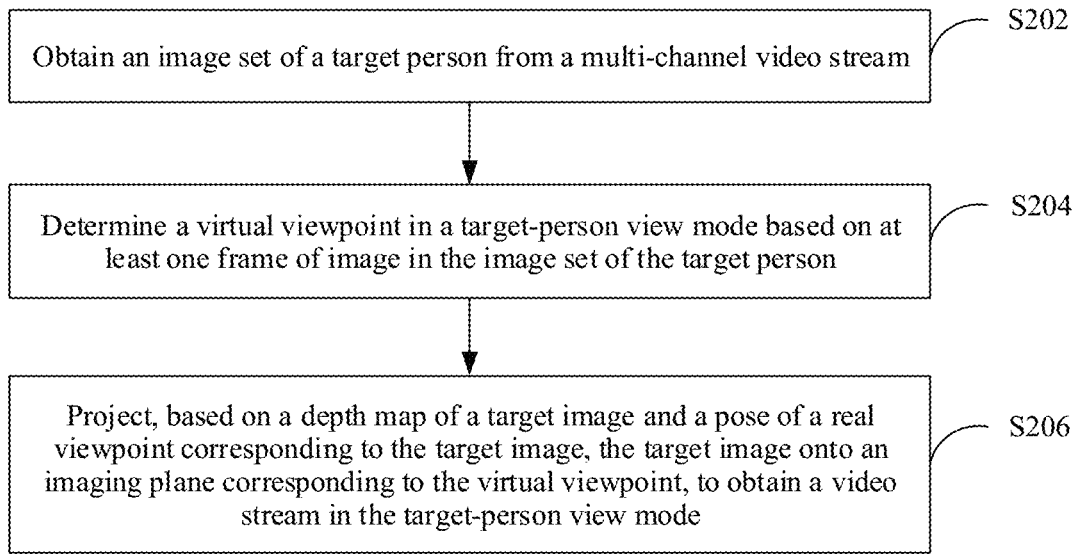
FIG. 2 is a flowchart of a video stream processing method according to this embodiment of this application.

With reference to FIG. 2, the following describes in detail a video stream processing method according to this embodiment of this application from a perspective of a server. As shown in the figure, the method includes the following steps.

S202: Obtain an image set of a target person from a multi-channel video stream.

The multi-channel video stream is a video stream obtained by shooting a same scene by a plurality of cameras, for example, may be a video stream obtained by shooting a large-scale activity scene such as a sports event or a cultural evening party by the plurality of cameras. In consideration of a requirement of an audience on video definition, a camera with a high-definition camera may be used to shoot the foregoing scene. The high-definition camera means that resolution is higher than preset resolution. The preset resolution may be set based on an actual requirement. In an example, the preset resolution may be set to 4K.

Because a high-definition video stream has a high requirement on transmission bandwidth and a network capacity, a server may receive the multi-channel video stream through a 5G communications network. Certainly, with development of communications technologies, the server may alternatively receive the multi-channel video stream through another communications module that has high bandwidth and a large network capacity.

The server first recognizes the target person in the multi-channel video stream, to implement conversion of a target-person view mode. The server may first decode the multi-channel video stream by using a decoder, to obtain an image frame sequence corresponding to each channel of video stream; and then detect, based on at least one frame of image in the image frame sequence, a face in the image by using a face detection technology, then perform clustering on a face of a same person by using a facial recognition technology, and select an image including a front face of the target person from clustered images to obtain the image set of the target person, where at least one frame of image in the image set includes the front face of the target person. It should be noted that the image including the front face of the target person is any image that can present an overview of the full face of the target person, and is not limited to an image shot when a camera completely faces the face.

Face detection may be implemented through a face detection network. In the face detection network, an image including a face is used as an input, and a detection box that identifies a face location is used as an output. In actual application, the server may directly perform face detection through an open-source face detection network, or may obtain a training sample marked with a face location, train the face detection network by using the training sample, and perform face detection by using the trained face detection network.

Based on the foregoing face detection, the server may mark a facial feature point, and recognize a face based on information about the marked feature point, to implement face clustering. The facial feature point is also referred to as a facial key point, and is a point for identifying a facial key part. The key part may be at least one of parts such as an eyebrow, an eye, a nose, a mouth, and a mandible. One part may be identified by using at least one point. It may be understood that using a plurality of parts and a large quantity of points for identification helps improve accuracy of facial recognition or face clustering.

After the face is identified, feature information corresponding to the facial feature point may be extended to high-dimensional vector space. A face distance is calculated in the high-dimensional vector space, for example, a Euclidean distance may be calculated, and the distance is compared with a preset discrimination threshold, to determine whether two faces are a same person, and aggregation is performed on an image including a face of the same person, to implement face clustering. A dimension and a discrimination threshold of the high-dimensional vector space may be set based on an empirical value. In an example, the high-dimensional vector space may be 128-dimensional vector space, and the discrimination threshold may be 0.6.

After identifying the facial key part of the face image by using the facial feature point, the server may further compare the face image with a standard face, and calculate an offset angle of the facial feature point, to obtain angles of the face in the image. The server may determine the front face based on the angles of the face in the image. In this way, the server may select the image including the front face from the clustered images to obtain the image set of the target person.

It may be understood that the target person may be any one or more of persons in the multi-channel video stream. The server may perform face clustering on all persons in the multi-channel video stream, select images including front faces of the persons to obtain image sets of the persons, and use the image sets as the image set of the target person. Certainly, the server may also perform face clustering on only some of all persons in the multi-channel video stream, select images including front faces to obtain image sets of some persons, and use the image sets as the image set of the target person.

In consideration of many factors such as costs and benefits, in actual application, the server may determine, as the target person, a person specified by a user, or determine, as the target person, a person whose appearance frequency is higher than a preset frequency in the multi-channel video stream, then perform face clustering on the target person, and select, based on a clustering result, the image including the front face of the target person to obtain the image set of the target person.

S204: Determine a virtual viewpoint in the target-person view mode based on the at least one frame of image in the image set.

In this embodiment, to convert the multi-channel video stream into a video stream in the target-person view mode, the server may virtualize a camera at a line-of-sight start point (that is, a viewpoint) of the target person, and then project an image shot by a real camera onto an imaging plane of the virtual camera, to implement conversion of the view mode. A location of the virtual camera is a virtual line-of-sight start point, and is also referred to as a virtual viewpoint.

Considering that images shot by a plurality of cameras need to be projected onto the imaging plane of the virtual camera, the server may establish a world coordinate system, to implement unified processing on the images shot by the plurality of cameras in the world coordinate system. When processing the images shot by the plurality of cameras in the world coordinate system, the server may first determine a location of the virtual viewpoint in the target-person view mode in the world coordinate system.

The location of the virtual viewpoint in the world coordinate system may be represented by angles of the virtual viewpoint in the world coordinate system and a distance from the virtual viewpoint to an origin of the world coordinate system. In actual application, for the at least one frame of image in the image set, the server may determine the angles of the virtual viewpoint in the world coordinate system based on angles of a pupil in the image in the world coordinate system, and determine the distance from the virtual viewpoint to the origin of the world coordinate system based on a depth map corresponding to the image, to determine the location of the virtual viewpoint in the world coordinate system, that is, determine the virtual viewpoint in the target-person view mode. It should be noted that, when a pupil location is used to determine the virtual viewpoint in the target-person view mode, the pupil can be recognized from the image including the front face in the image set.

In some embodiments, the server may perform face angle estimation on the at least one frame of image in the image set to determine angles of a face of the target person in the world coordinate system, perform pupil location estimation on a pupil of the target person in the image to determine angles of the pupil in the face, and may determine angles of the pupil of the target person in the world coordinate system based on the angles of the pupil of the target person in the face and the angles of the face of the target person in the world coordinate system.

In an embodiment, the server may compare a face in the at least one frame of image in the image set with a standard face by using a pre-trained position map regression network (PRN), and reversely calculate an offset angle of a facial key point through affine transformation, to obtain angles of the face of the target person in the at least one frame of image that are in the image. Then, the server may determine angles of the face of the target person in the world coordinate system based on the angles of the face of the target person in the image and angles of an imaging plane of the image in the world coordinate system, to obtain a face angle estimation result.

Figure 3:
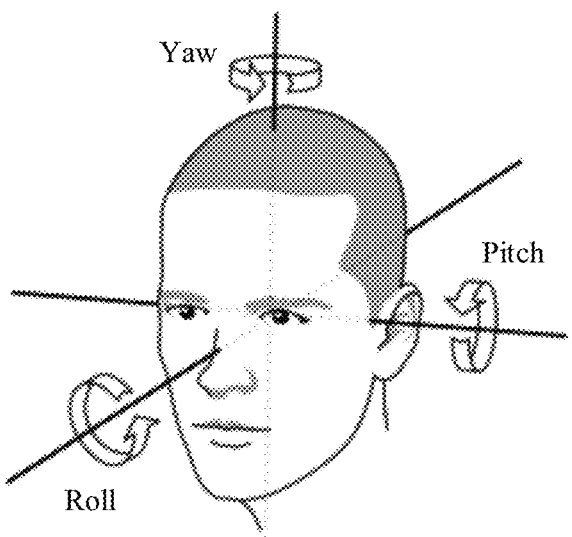
FIG. 3 is a diagram of angles of a face in an image according to this embodiment of this application.

Refer to FIG. 3. The angles of the face in the image may be represented by rotation angles in three directions of an x-axis, a y-axis, and a z-axis in a camera coordinate system (a coordinate system established based on a camera, where an optical center is used as an origin, an optical axis is used as a z-axis, and an xy plane is parallel to the imaging plane of the image), and are represented as roll, yaw, and pitch. Herein, roll is used to indicate an angle of rolling the head left and right, yaw is used to indicate an angle of yawing the head left and right, and pitch is used to indicate an angle of pitching the head. Because values of all the angles range from −180° to 180°, the server may simulate any angle in the camera coordinate system by using the foregoing values of the three angles.

Further, the server maps the angles to the world coordinate system based on an angle of view of the camera, to obtain the angles of the face in the world coordinate system. For ease of understanding, a correspondence between a rotation angle of the world coordinate system and a rotation angle of the camera coordinate system in an x-axis direction is used as an example for description.

Figure 4:
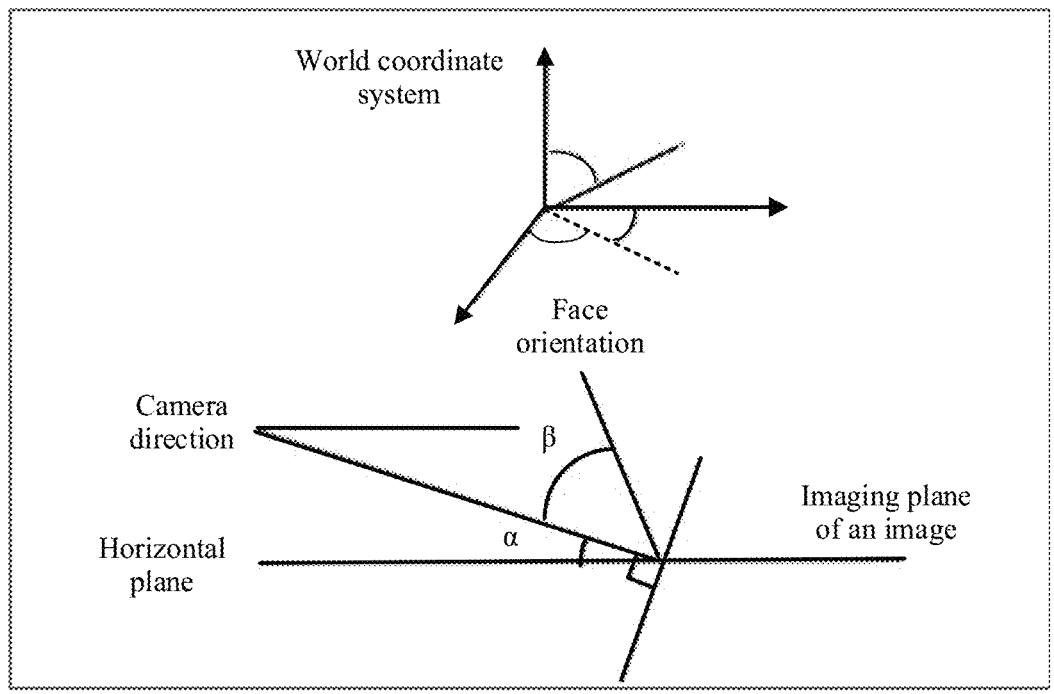
FIG. 4 is a diagram of angles of a face in a world coordinate system according to this embodiment of this application.

Refer to FIG. 4. In this example, the angle of view of the camera is $\alpha$, and a component that is of the angles of the face in the image and that is on the x-axis is $\beta$. Assuming that a clockwise direction is positive and a horizontal angle is 0°, a component that is of the angles of the face in the world coordinate system and that is on the x-axis may be $180+\alpha+\beta$. Similarly, components that are of the angles of the face in the world coordinate system and that are on the y-axis and the z-axis may be determined in a similar manner. In this way, the angles of the face in the world coordinate system may be determined.

For the at least one frame of image in the image set, the server may further locate a key location of a human eye, and capture an eye image to perform pupil location estimation. In an embodiment, the server may determine an eye area of the target person in the at least one frame of image through face alignment, to obtain an eye image, and then perform pupil location recognition on the eye image of the target person by using a pre-trained deep neural network (DNN).

The DNN may be obtained through training by using a data set for marking a pupil center. In a manual or machine manner, a location of an eyeball in an orbit is marked on an image by using a rectangular box, a pupil center location is located and used as training data, and a tailored residual network (ResNet), that is, a ResNet 18, is used as a backbone network. Then, a target extraction detection network (i.e., a part of the network) based on a single shot multibox detector (SSD) is connected after the ResNet 18, to form a complete SSD network.

A top layer (also referred to as an extra feature layer) of the SSD network includes a plurality of convolutional layers. In actual application, the image may be divided into a plurality of small blocks, one small block is a cell, and one cell includes at least one grid, for example, may include an 8*8 grid or a 6*6 grid. The extra feature layer of the SSD network continuously halves a grid quantity at a pooling layer (or by setting a stride to 2) until the grid quantity is 1. Correspondingly, a size of each grid doubles as the grid quantity is halved. In this way, grids (referred to as multi-boxes in this embodiment of this application) of different shapes and sizes may be created to anchor objects of different shapes and sizes.

For a p-channel convolutional layer with a size of m*n, a 3*3 p-channel convolutional kernel may be used as a basic prediction element for prediction. A prediction value may be obtained from at least one location of an image. The prediction value may be a score of a type such as an eyeball, and may represent a probability that the location belongs to the eyeball, or may be an offset of a predicted rectangular detection box relative to a marked rectangular detection box. An SSD model parameter is adjusted based on the score or the offset, to implement SSD model training.

Figure 5:
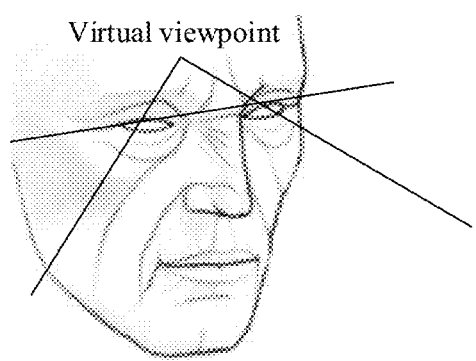
FIG. 5 is a diagram of determining a virtual viewpoint according to this embodiment of this application.

After an SSD model is obtained through training, the at least one frame of image in the image set is input into the SSD model for detection, and then an inscribed circle center of the rectangular detection box is calculated to obtain a pupil center location. The center location is a pupil location estimation result. Angles of a pupil in the face may be determined based on a location of the pupil in the orbit. The angles of the pupil in the face may include a horizontal direction angle and a vertical direction angle. Angles of the pupil in the world coordinate system may be determined based on the angles (yaw, pitch, roll) of the face in the world coordinate system and the angles (horizontal, vertical) of the pupil in the face, and may be represented as (yaw+horizontal, pitch+vertical, roll). It should be noted that, when an eyeball does not move, a maximum field of view that can be seen from left to right is 115°, that is, a maximum field of view existing when the line of sight is maintained is 115°. Based on this, refer to FIG. 5. The server may connect pupil center locations of two eyes, and then determine a virtual viewpoint on a vertical central plane of a line segment formed by the pupil center locations, so that an included angle between two straight lines connecting the virtual viewpoint and the pupil center locations is 115°. Angles of the virtual viewpoint in the world coordinate system may be determined based on the angles of the pupil in the world coordinate system and the included angle between the virtual viewpoint and the pupil center locations.

For the at least one frame of image in the image set, the server may determine a distance from the virtual viewpoint to an origin of the world coordinate system based on a depth map of the at least one frame of image. A camera coordinate system is established by using a real viewpoint (that is, a camera) of one frame of image as an origin. A pixel value of each pixel in a depth map of the one frame of image may represent a distance from a photographed object to the camera. A distance from an origin of the world coordinate system to an origin of the camera coordinate system and angles of the origin of the world coordinate system that are in the camera coordinate system may be determined based on a correspondence between the camera coordinate system and the world coordinate system, and a distance from the virtual viewpoint to the origin of the camera coordinate system may be determined based on depth information corresponding to the virtual viewpoint in the depth map.

The server may calculate a distance from the virtual viewpoint to the origin of the world coordinate system by using a cosine formula based on the distance from the origin of the world coordinate system to the origin of the camera coordinate system, the angles of the origin of the world coordinate system that are in the camera coordinate system, the angles of the virtual viewpoint in the world coordinate system, and the distance from the virtual viewpoint to the origin of the camera coordinate system. The depth map may be obtained through shooting by using a depth camera with a depth of field, for example, an RGBD camera, or may be obtained through calculation by using a supervised deep learning method. It is clear that obtaining the depth map through calculation by using the supervised deep learning method can further reduce costs brought by the depth camera.

It should be noted that, in some scenarios, for example, when shooting a football field, a camera may be blown askew, or some cameras seriously deviate from a focus area. As a result, a generated depth map may be incomplete. Therefore, lens calibration may be performed on an image after a video stream is decoded to obtain the image, so that as many same objects as possible can be photographed in images shown by adjacent cameras.

S206: Project, based on a depth map of a target image and a pose of a real viewpoint corresponding to the target image, the target image onto an imaging plane corresponding to the virtual viewpoint, to obtain a video stream in the target-person view mode.

The target image includes an image that has an intersection with a vision field of the target person in the multi-channel video stream. The vision field may be understood as a field of vision or a field of view. When an image in the target-person view mode is drawn, an object beyond the field of view of the target person is not drawn. Therefore, only the image that has the intersection with the vision field of the target person in the multi-channel video stream, that is, the target image, may be processed.

In actual application, the server may determine, based on the virtual viewpoint, an overlapped vision field between an upper 150-degree vision field and a lower 150-degree vision field that are of two eyes in a 115-degree maximum horizontal field of view as the vision field of the target person. The server may further determine an attention-focused vision field, that is, an upper 40° field of view, a lower 50° field of view, a left 55° field of view, and a right 55° field of view, as the vision field of the target person. Certainly, the server may further adjust the vision field based on a vision status of the target person, to obtain the vision field of the target person.

After determining the virtual viewpoint and the vision field of the target person, the server may project, based on the depth map of the target image and the pose of the real viewpoint corresponding to the target image and by using a depth-image-based rendering (DIBR) technology, the target image onto the imaging plane corresponding to the virtual viewpoint, to obtain the video stream in the target-person view mode. The real viewpoint is a real camera, and the pose of the real viewpoint is used to represent a location and a pose of the real camera. In actual application, an extrinsic parameter matrix of the camera or the like may be used to represent the pose of the real camera.

Figure 6:
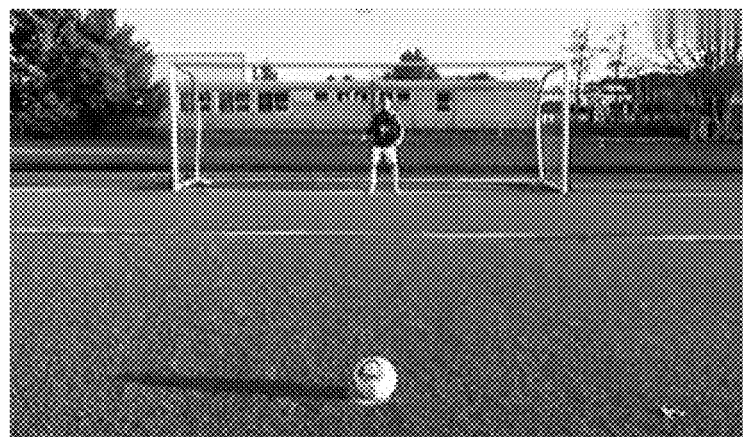
FIG. 6 is a diagram of an effect of converting a video stream into a video stream in a first-person view mode according to this embodiment of this application.

During projection, the server may first backproject the target image onto three-dimensional space, for example, onto a world coordinate system, and then project pixels in the three-dimensional space to the imaging plane corresponding to the virtual viewpoint, to simulate an image shot from the virtual viewpoint. In an example, FIG. 6 shows an image in a player view mode. A video stream in a target-person view mode may be obtained by encoding a simulated multi-frame image by using an encoder.

It may be understood that the server includes a video stream in a third-person view mode and the video stream in the target-person view mode. When the user triggers a mode switching operation, the user terminal may send a mode switching request to the server, and the server may send the video stream in the corresponding view mode to the user terminal in response to the request.

For example, a current view mode of the user terminal is the third-person view mode. When the user triggers a mode switching operation, and requests to switch to the target-person view mode, the server sends the switching in the target-person view mode to the user terminal. Only switching between the third-person view mode and the target-person view mode is described above. In some cases, view modes of different target persons may be further switched.

Based on the descriptions of the foregoing content, in this application, the image set of the target person is obtained from the multi-channel video stream, the virtual viewpoint in the target-person view mode is determined based on the at least one frame of image in the image set, and then the image that has the intersection with the vision field of the target person in the multi-channel video stream is projected, based on the depth map and the pose of the real viewpoint, onto the imaging plane corresponding to the virtual viewpoint, to obtain the video stream in the target-person view mode. In this way, the audience can substitute for the target person in the video stream, to enhance a sense of interaction. In addition, when the video stream is converted, only the image that has the intersection with the vision field of the target person needs to be projected. This greatly reduces a quantity of images that need to be processed, improves conversion efficiency, and can meet a real-time service requirement.

To make the technical solutions of this embodiment of this application clearer and more comprehensible, the following describes in detail an image backprojection and projection process from a perspective of coordinate system conversion.

Backprojection mainly refers to mapping a two-dimensional image to a three-dimensional image, and projection refers to mapping a three-dimensional image to a two-dimensional image. A pixel coordinate system, an image coordinate system, a camera coordinate system, and a world coordinate system are usually involved in the foregoing process.

Figure 7:
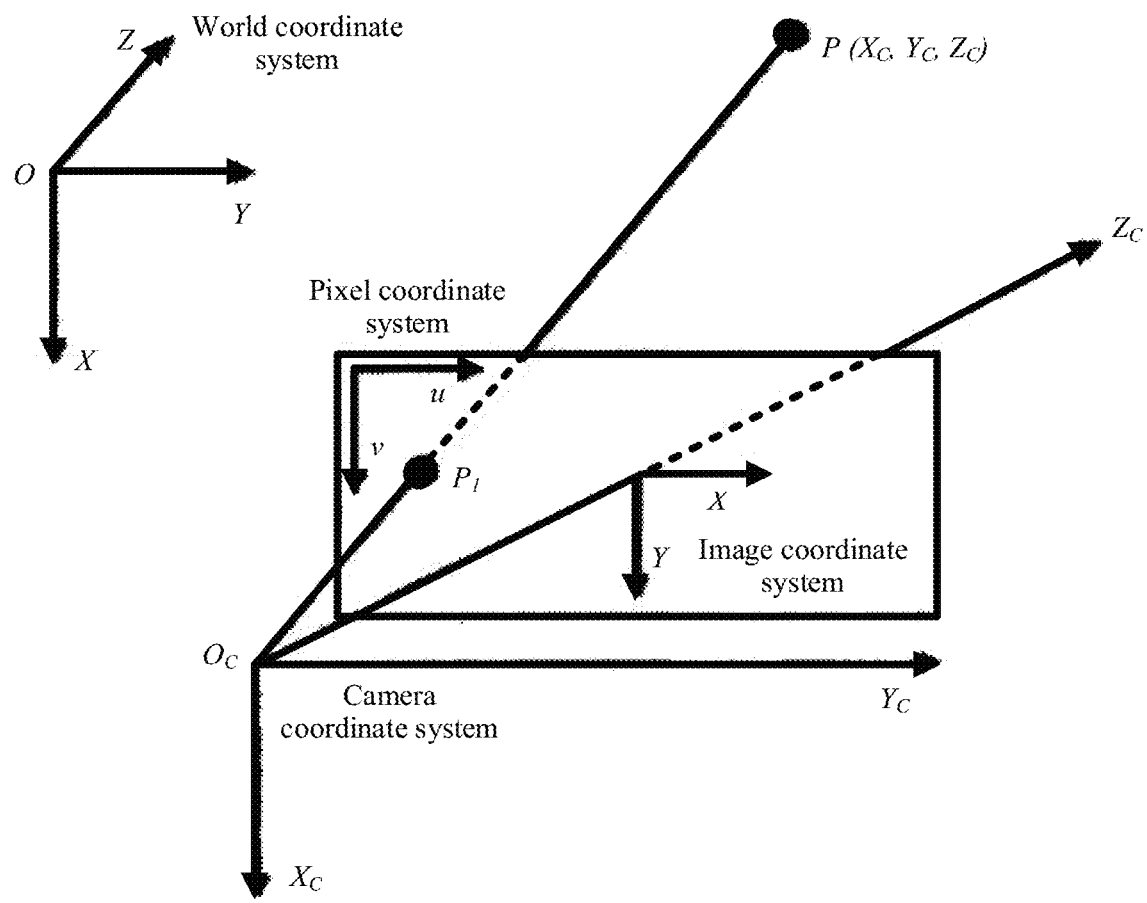
FIG. 7 is a diagram of a coordinate system relationship according to this embodiment of this application.

Refer to FIG. 7. Both an image coordinate system and a pixel coordinate system are two-dimensional coordinate systems, and the image coordinate system is obtained by translating the pixel coordinate system. Usually, the pixel coordinate system is used when an image is processed, for example, an operation is performed on a row or a column of the image. When normalization is performed, a physical distance represented by a pixel unit is interpreted, or feature information is extracted, the pixel coordinate system needs to be converted into the image coordinate system. For details, refer to the following formula:

$$u = \frac{x}{dx} + m_u \qquad (1)$$
$$v = \frac{y}{dy} + m_v$$

Herein, (u,v) is pixel coordinates in the pixel coordinate system, (x, y) is physical coordinates in the image coordinate system, dx and dy respectively represent physical distances (unit: mm/pixel) of a pixel in a horizontal direction and a vertical direction, and $m_u$ and $m_v$ represent a translation relationship.

Formula (1) may also be converted into homogeneous coordinates. Details are as follows:

$$\begin{bmatrix} u \\ v \\ 1 \end{bmatrix} = \begin{bmatrix} \frac{1}{dx} & 0 & m_u \\ 0 & \frac{1}{dy} & m_v \\ 0 & 0 & 1 \end{bmatrix} * \begin{bmatrix} x \\ y \\ 1 \end{bmatrix} \qquad (2)$$

Figure 8:
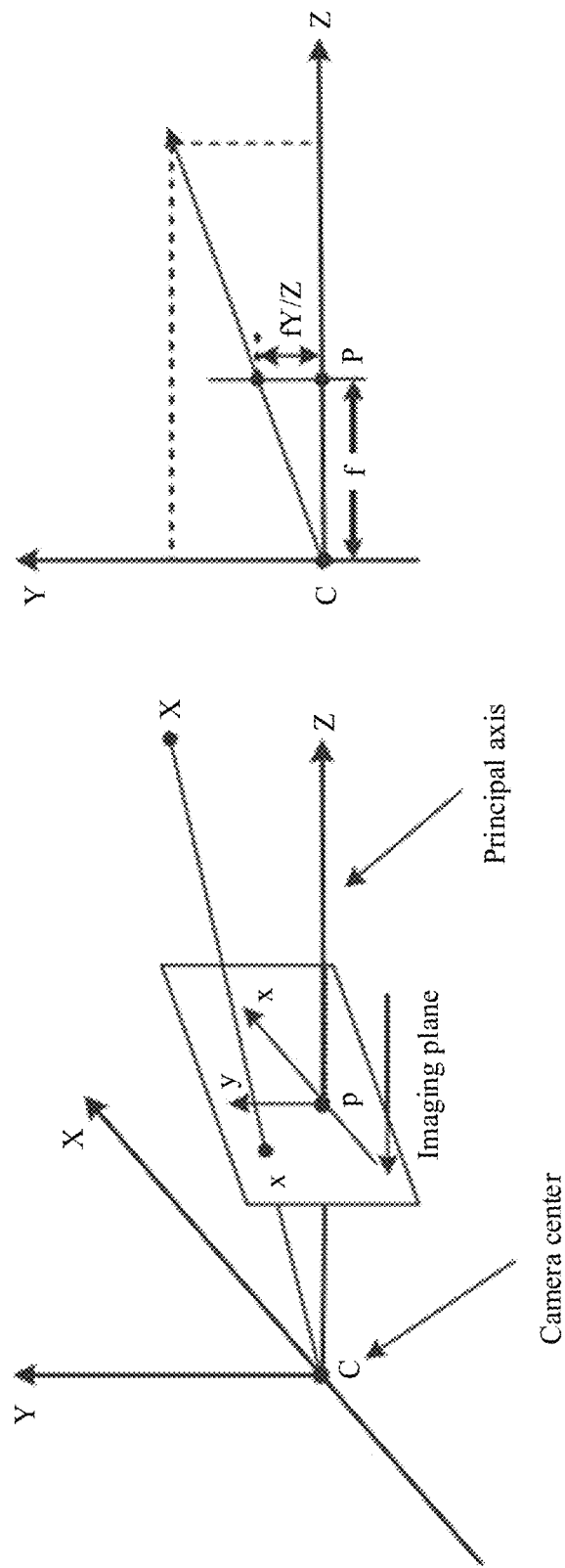
FIG. 8 is a diagram of conversion between an image coordinate system and a camera coordinate system according to this embodiment of this application.

As shown in FIG. 7, a camera coordinate system is a three-dimensional coordinate system. A point P in an actual physical world is imaged as P1 on an imaging plane of a camera. An X-axis and a Y-axis of the camera coordinate system are parallel to an x-axis and a y-axis of the image coordinate system. A three-dimensional space point is projected onto a YZ plane. A relationship between the camera coordinate system and the image coordinate system may be determined based on a triangle relationship of the plane. As shown in FIG. 8, f represents a focal length. Considering that a single pixel is usually rectangular on an imager, that is, focal lengths in an x direction and a y direction are different, and may be respectively represented by $f_x$ and $f_y$. In addition, a principal point (an intersection point of a principal line of sight and an imaging plane of a camera) is not necessarily at a center of the imaging plane of the camera. To accurately represent a possible offset, offset parameters $c_x$ and $c_y$ in the x and y directions may be introduced. In this way, a location of a point X in space on the image plane is as follows:

$$x_{screen} = f_x\left(\frac{X_C}{Z_C}\right) + c_x, \text{ and } y_{screen} = f_y\left(\frac{Y_C}{Z_C}\right) + c_y \qquad (3)$$

The foregoing formula is converted into homogeneous coordinates. Details are as follows:

$$\begin{bmatrix} x_{screen} \\ y_{screen} \\ 1 \end{bmatrix} = \begin{bmatrix} f_x & 0 & c_x \\ 0 & f_y & c_y \\ 0 & 0 & 1 \end{bmatrix} * \begin{bmatrix} X_C \\ Y_C \\ Z_C \end{bmatrix} \qquad (4)$$

The foregoing manner of converting the camera coordinate system into the image coordinate system is a process of capturing an image inside the camera, and a matrix for implementing the conversion is an intrinsic parameter matrix K of the camera. The intrinsic parameter matrix may be obtained by marking the camera.

It should be noted that, in some complex imaging models, the X-axis and the Y-axis of the camera coordinate system are not necessarily perpendicular. Therefore, an offset angle is further introduced. In this case, the intrinsic parameter matrix may also be represented as follows:

$$\begin{bmatrix} x_{screen} \\ y_{screen} \\ 1 \end{bmatrix} = \begin{bmatrix} f_x & \text{alpha} * f_x & c_x \\ 0 & f_y & c_y \\ 0 & 0 & 1 \end{bmatrix} * \begin{bmatrix} X_C \\ Y_C \\ Z_C \end{bmatrix} \qquad (5)$$

Figure 9:
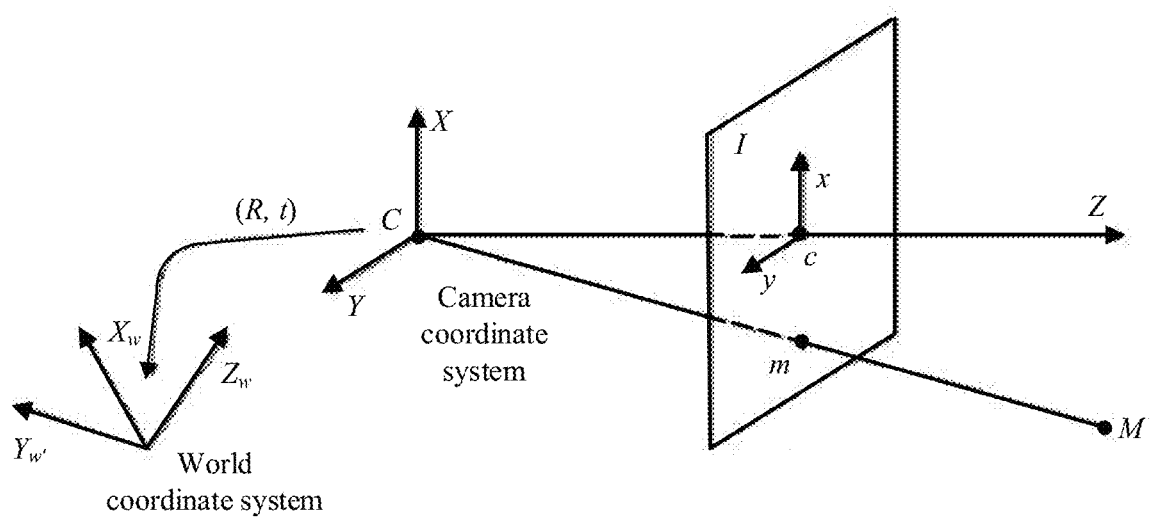
FIG. 9 is a diagram of conversion between a camera coordinate system and a world coordinate system according to this embodiment of this application.

It may be understood that conversion from the pixel coordinate system of the image to the image coordinate system obtained through imaging and then to the actual camera coordinate system is conversion between internal coordinate systems of the camera. To fuse images corresponding to a virtual viewpoint, conversion from the camera coordinate system to a world coordinate system further needs to be implemented. As shown in FIG. 9, the camera coordinate system may be converted into the world coordinate system through rotation and translation. In an embodiment, a rotation matrix R and a translation matrix t may be determined. In this case, a location that is of a point in the world coordinate system and that is in the camera coordinate system is as follows:

$$\begin{bmatrix} X_C \\ Y_C \\ Z_C \end{bmatrix} = R * \begin{bmatrix} X_W \\ Y_W \\ Z_W \end{bmatrix} + t \tag{6}$$

The rotation matrix R and the translation matrix t form an extrinsic parameter matrix (which may be represented as R|t) of the camera. The extrinsic parameter matrix may also be obtained by marking the camera.

Figure 10:
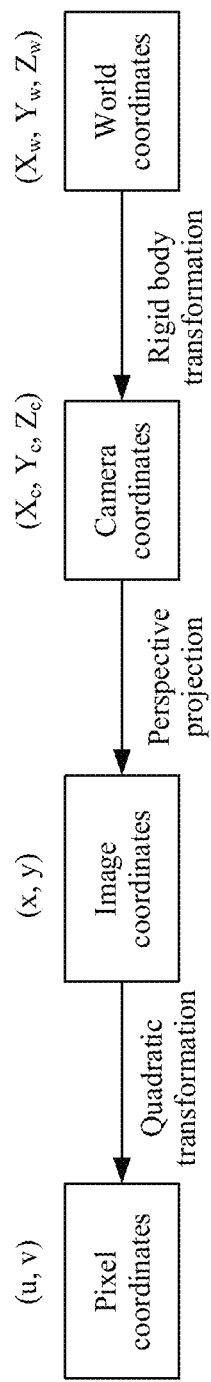
FIG. 10 is a diagram of mapping a world coordinate system to a pixel coordinate system according to this embodiment of this application.

Then, refer to FIG. 10. Rigid body transformation may be implemented by left multiplying coordinates (that is, world coordinates) of a point in the world coordinate system by an extrinsic parameter matrix (for example, the matrix formed by R and t in Formula (6)) to obtain camera coordinates of the point in the camera coordinate system, image projection may be implemented by left multiplying the camera coordinates by a perspective matrix (that is, the extrinsic parameter matrix shown in Formula (4) or (5)) to obtain image coordinates of the point in the image coordinate system, and then pixel coordinates may be obtained by left multiplying the image coordinates by a quadratic transformation matrix (the matrix shown in Formula (2)). In an example, for an embodiment process, refer to the following formula:

$$s \cdot \begin{bmatrix} u \\ v \\ 1 \end{bmatrix} = \begin{bmatrix} \frac{1}{dx} & 0 & m_u \\ 0 & \frac{1}{dy} & m_v \\ 0 & 0 & 1 \end{bmatrix} \cdot \begin{bmatrix} f_x & 0 & c_x \\ 0 & f_y & c_y \\ 0 & 0 & 1 \end{bmatrix} \cdot \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \cdot \begin{bmatrix} X_W \\ Y_W \\ Z_W \\ 1 \end{bmatrix} \tag{7}$$

Herein, s is a shrinkage factor; on the right of the equation, the first matrix is the quadratic transformation matrix, the second matrix is the intrinsic parameter matrix K, and the third matrix is the extrinsic parameter matrix R|t; and a product of the three matrices may be denoted as a projection matrix P. This process is a projection process, and a reverse process of the projection process may be referred to as backprojection.

After a real camera is marked to obtain a quadratic transformation matrix, an intrinsic parameter matrix, and an extrinsic parameter matrix of the real camera, a projection matrix, also referred to as a first projection matrix, of the real camera may be obtained through a matrix multiplication operation. The server may determine a location of each pixel in the world coordinate system based on pixel coordinates of each pixel in a target image and a depth map corresponding to the target image.

For ease of understanding, a point m=[u,v]$^T$ in the target image is used as an example for description. A depth of the point is Z, and the following equation set may be established according to Formula (7):

$$\begin{cases} P_{11}X + P_{12}Y + P_{13}Z + P_{14} = su \\ P_{21}X + P_{22}Y + P_{23}Z + P_{24} = sv \\ P_{31}X + P_{32}Y + P_{33}Z + P_{34} = s \end{cases} \tag{8}$$

In Formula (7), $P_{ij}$ is an element in a row i and a column j of the projection matrix P of the real camera, and a point M corresponding to the point m in the world coordinate system may be calculated based on known u, v, and Z.

After determining a virtual viewpoint and a vision field of a virtual camera, the server may determine depth information based on coordinates of the virtual viewpoint in the world coordinate system and coordinates of the point M in the world coordinate system, and may generate, based on the depth information, a depth map corresponding to the virtual viewpoint. An intrinsic parameter matrix of the virtual camera may be the same as the intrinsic parameter matrix of the real camera. Therefore, the server may determine an extrinsic parameter matrix of the virtual camera, and then determine a projection matrix $P_v$, also referred to as a second projection matrix, of the virtual camera based on the intrinsic parameter matrix and the extrinsic parameter matrix.

In an embodiment, the server may determine the extrinsic parameter matrix of the virtual camera based on information including the depth map corresponding to the virtual viewpoint, and further determine the projection matrix $P_v$ of the virtual camera based on the intrinsic parameter matrix and the extrinsic parameter matrix of the virtual camera. The server re-projects the point M in the world coordinate system onto an imaging picture of the virtual camera according to Formula (7), to obtain new pixel coordinates m', performs the foregoing image processing on each point of the target image, and then encodes a processed image to obtain a video stream in an angle of view of the virtual camera, that is, the video stream in the target-person view mode.

The foregoing describes the video stream processing method from a perspective of the server. The following describes the video stream processing method in this embodiment of this application from a perspective of a user terminal.

Figure 11:
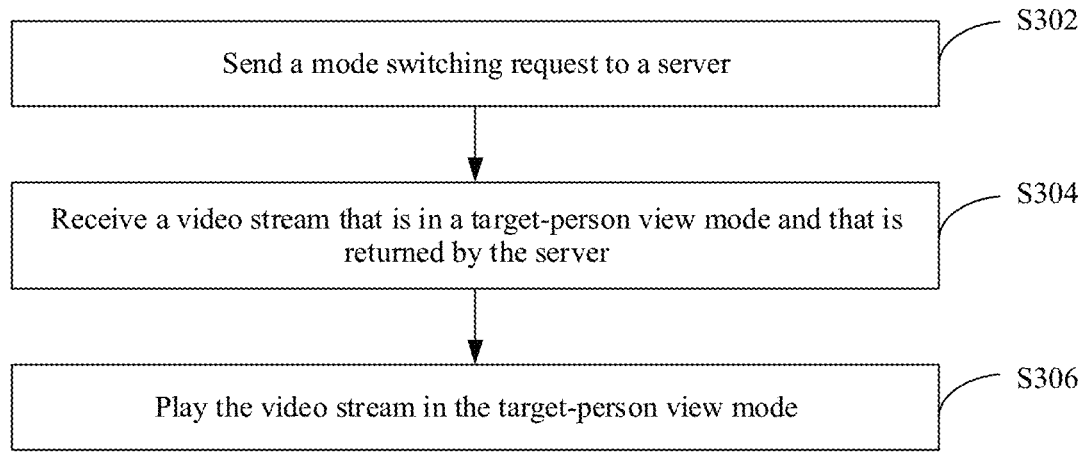
FIG. 11 is a flowchart of a video stream processing method according to this embodiment of this application.

FIG. 11 is a flowchart of a video stream processing method. The method includes the following steps.

S302: Send a mode switching request to a server.

The mode switching request carries an identifier of a target person, and is used to request to switch a view mode of a video stream to a target-person view mode. The target person is a person included in a multi-channel video stream obtained by shooting a same scene by a plurality of cameras. The target person may be one or more of persons included in the multi-channel video stream. For example, in a live broadcast scenario of a sports event, the target person may be one or more of an athlete, a coach, or a referee, and the identifier of the target person may be a name, a number, or the like of the target person.

A user terminal may send the mode switching request to the server when being triggered. The user terminal may support a plurality of triggering mechanisms to trigger mode switching. A user may trigger a mode switching operation by using a remote control device such as a remote control or a smartphone having a remote control function. The user generates the mode switching request in response to the operation, and then sends the mode switching request to the server. Certainly, the user terminal may also provide a mode switching control. The user may trigger a mode switching operation by touching or tapping the mode switching control. In response to the mode switching operation, the user terminal generates the mode switching request, and sends the mode switching request to the server. In some embodiments, the user may trigger a mode switching operation by using a voice, a gesture, or the like. In response to the mode switching operation, the user terminal may generate the mode switching request, and send the mode switching request to the server.

The trigger mode switching mechanism is a switching mechanism actively initiated by the user. In some embodiments, the server may further display, in a video stream playing interface, for example, a video stream playing interface in a third-person view mode, a video synopsis that corresponds to a video stream in the target-person view mode and that is pushed by the server, where the video synopsis may be a static video synopsis or a dynamic video synopsis. The user may trigger the video synopsis through tapping, touching, voice control, or the like. In response to a trigger operation performed on the video synopsis, the user terminal generates the mode switching request, to switch from the third-person view mode to the target-person view mode.

S304: Receive the video stream that is in the target-person view mode and that is returned by the server.

The video stream in the target-person view mode is obtained by projecting, based on a depth map of a target image and a pose of a real viewpoint corresponding to the target image, the target image onto an imaging plane corresponding to a virtual viewpoint in the target-person view mode. The target image is an image that has an intersection with a vision field of the target person in the multi-channel video stream. The virtual viewpoint in the target-person view mode is a virtual viewpoint based on a line of sight of the target person, and the virtual viewpoint may be determined based on at least one frame of image in an image set that is of the target person and that is obtained from the multi-channel video stream. The at least one frame of image in the image set includes a front face of the target person.

S306: Play the video stream in the target-person view mode.

The user terminal plays the video stream in the target-person view mode, to switch the view mode of the video stream to the target-person view mode, so that the user can watch a video in the target-person view mode, so as to enhance a sense of interaction and a sense of immersion.

Further, considering interaction experience, the user terminal may receive a video stream that is in an associated-person view mode and that is returned by the server, where an associated person is a person that has an association relationship with the target person in multi-channel video stream. The user terminal may play the video stream in the target-person view mode and the video stream in the associated-person view mode, so that the user can watch a video from a plurality of person fields of view and learn more detailed information, to improve user experience.

It should be noted that the video stream may be usually transmitted from the server to the user terminal through streaming transmission. Therefore, when transmitting the video stream in the target-person view mode, the server may perform image recognition on an image in the video stream in the target-person view mode. When identifying that the target person performs a preset action or is to perform a preset action, the server automatically returns, to the user terminal, the video stream in the view mode of the associated person that has the association relationship with the target person. Certainly, after the action is completed, the server may stop returning the video stream in the associated-person view mode to the user terminal.

In some embodiments, the server may also return the video stream in the associated-person view mode to the user terminal after receiving an associated-person view mode request sent by the user terminal. When watching a video, the user may trigger an associated-person view mode request operation by using an associated-person view mode control displayed in the video stream playing interface. In response to the operation, the user terminal generates the associated-person view mode request, and sends the associated-person view mode request to the server, to request the video stream in the associated-person view mode.

When obtaining the video stream in the target-person view mode and the video stream in the associated-person view mode, the user terminal may play the video stream in the target-person view mode and the video stream in the associated-person view mode through a plurality of independent windows. Certainly, the user terminal may also play the video stream in the target-person view mode and the video stream in the associated-person view mode in a manner of displaying one video stream in a main window and displaying another video stream in a sub-window in the main window. In an embodiment, the user terminal may display the video stream in the target-person view mode in the main window, and display the video stream in the associated-person view mode in the sub-window.

It should be noted that, when identifying that the preset action is completed, the server may stop returning the video stream in the associated-person view mode to the user terminal, and the user terminal may exit a target-person view playing mode and an associated-person view playing mode, and resume a playing mode of playing the video stream in the target-person view mode.

For ease of understanding the technical solutions of this embodiment of this application, this embodiment of this application further provides an example for description.

Figure 12:
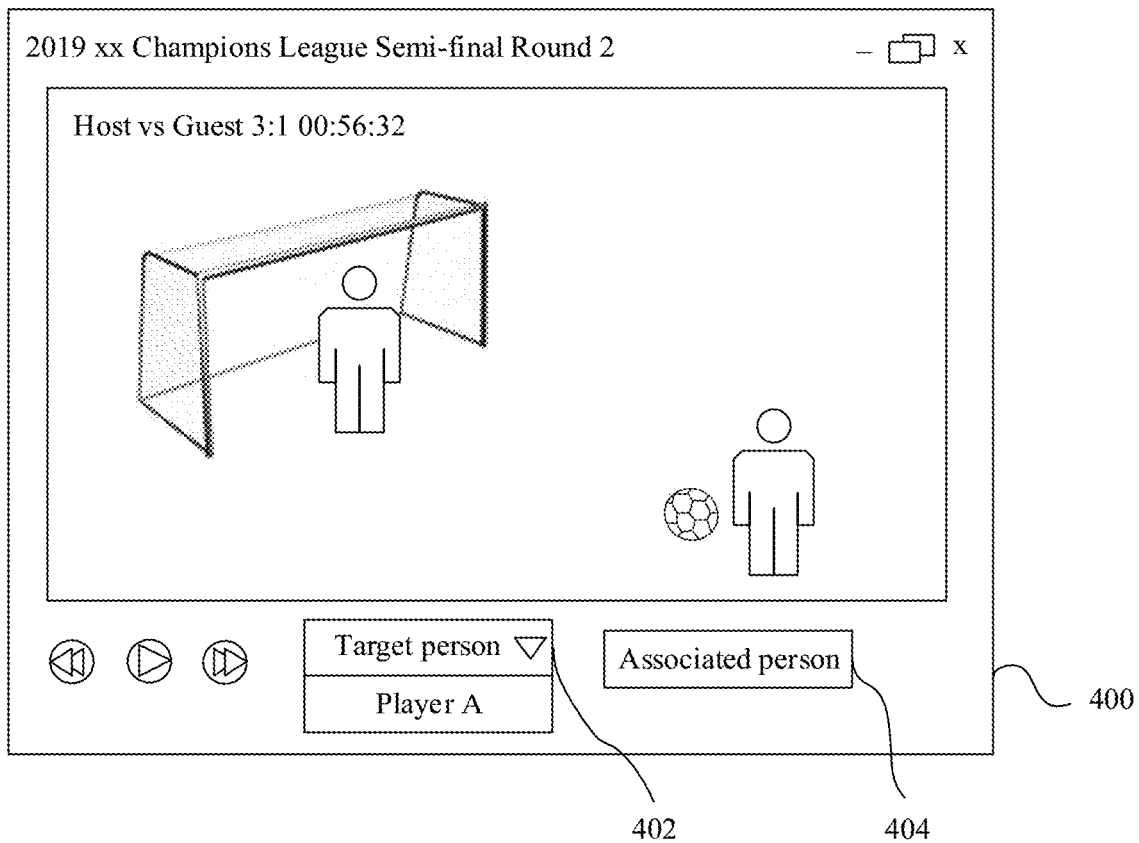
FIG. 12 is a diagram of a scenario of a video stream processing method according to this embodiment of this application.

As shown in FIG. 12, when playing a football game, a user may select a player such as a player A in the football game as a target person, and trigger a mode switching operation by using a mode switching control 402 in a video stream playing interface 400. In response to the mode switching operation, the user terminal generates a mode switching request, and sends the mode switching request to the server, where the mode switching request carries a name of the player A. In this way, when receiving the mode switching request, the server returns a video stream in a player-A view mode to the user terminal.

When playing the video stream in the player-A view mode, the user may further trigger an associated-person view mode request operation to request a video stream in an associated-person view mode. For example, the player A is a forward. When the player A performs a shooting action or is to perform a shooting action, the user may further trigger an associated-person view mode request operation by using an associated-person view mode request control 404. In response to the operation, the user terminal sends an associated-person view mode request to the server, where an associated person may be a goalkeeper. Certainly, in some cases, the associated person may further include a defensive player and a referee. After receiving the associated-person view mode request, the server returns the video stream in the associated-person view mode to the user terminal, for example, a video stream in a goalkeeper view mode, a video stream in a defensive-player view mode, and a video stream in a referee view mode. The user terminal respectively plays, in a plurality of windows, the video stream in the player-A view mode, the video stream in the goalkeeper view mode, the video stream in the defensive-player view mode, and the video stream in the referee view mode.

Based on the descriptions of the foregoing content, in this embodiment of this application, the user terminal sends the mode switching request to the server, receives the video stream that is in the target-person view mode and that is returned by the server, and then plays the video stream in the target-person view mode. In this way, an audience can substitute for the target person in the video stream, to enhance a sense of interaction. In addition, when the view mode of the video stream is switched, only an image that has an intersection with a vision field of the target person needs to be processed. This greatly reduces a quantity of images that need to be processed, improves conversion efficiency, and can meet a real-time service requirement.

It should be noted that, for ease of description, the foregoing method embodiments are represented as a series of actions. However, a person skilled in the art should appreciate that this embodiment of this application is not limited to the described sequence of the actions.

Another appropriate step combination that a person skilled in the art can think of based on the content described above also falls within the protection scope of this embodiment of this application. In addition, a person skilled in the art should also appreciate that all the embodiments described in this specification are preferred embodiments, and the related actions are not necessarily mandatory to this embodiment of this application.

The foregoing describes, in detail with reference to FIG. 1 to FIG. 12, the video stream processing methods provided in this embodiment of this application. The following describes, with reference to FIG. 13 and FIG. 14, video stream processing apparatuses and devices provided in this embodiment of this application.

Figure 13:
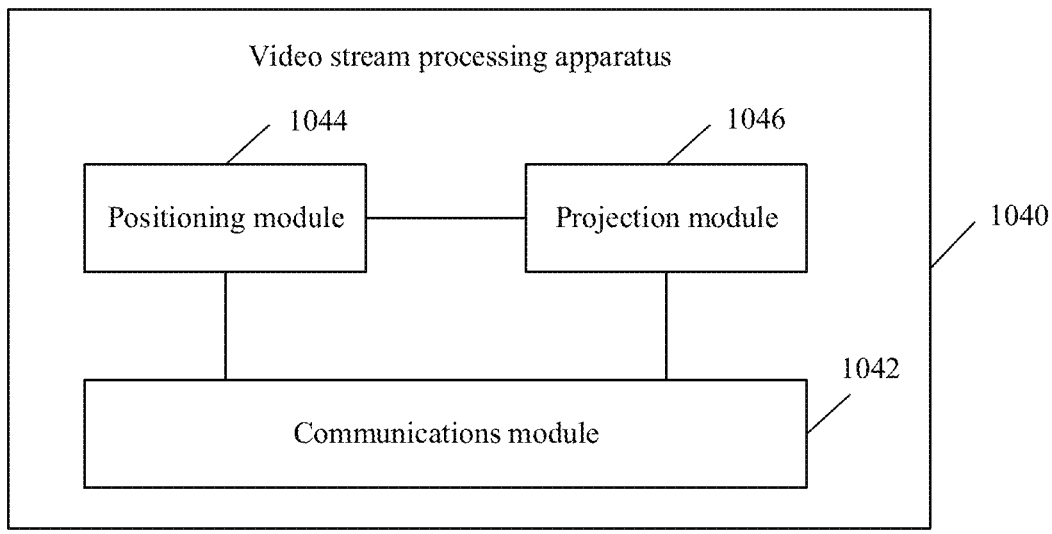
FIG. 13 is a diagram of a video stream processing apparatus according to this embodiment of this application.

FIG. 13 is a diagram of a video stream processing apparatus. The video stream processing apparatus 1040 includes the communications module 1042, the positioning module 1044, and the projection module 1046 shown in FIG. 1.

The communications module 1042 is configured to obtain a multi-channel video stream, where the multi-channel video stream is obtained by shooting a same scene by a plurality of cameras.

The positioning module 1044 is configured to: obtain an image set of a target person from the multi-channel video stream, and determine a virtual viewpoint in a target-person view mode based on the image set, where an image in the image set includes a front face of the target person.

The projection module 1046 is configured to project, based on a depth map of a target image and a pose of a real viewpoint corresponding to the target image, the target image onto an imaging plane corresponding to the virtual viewpoint, to obtain a video stream in the target-person view mode, where the target image is an image that has an intersection with a vision field of the target person in the multi-channel video stream.

Optionally, the positioning module 1044 is configured to: perform face angle estimation and pupil location estimation on at least one frame of image in the image set, to determine angles of the virtual viewpoint in the target-person view mode in a world coordinate system; and determine a distance from the virtual viewpoint in the target-person view mode to an origin of the world coordinate system based on a depth map corresponding to the at least one frame of image.

Optionally, the positioning module 1044 is configured to: determine an eye area of the target person in the at least one frame of image in the image set through face alignment, to obtain an eye image; and perform pupil location recognition on the eye image of the target person by using a pre-trained deep neural network.

Optionally, the projection module 1046 is configured to: determine a first projection matrix based on the pose of the real viewpoint corresponding to the target image; backproject the target image onto three-dimensional space based on the first projection matrix and the depth map of the target image; determine a second projection matrix based on a pose of the virtual viewpoint; and project, based on the second projection matrix, pixels in the three-dimensional space onto the imaging plane corresponding to the virtual viewpoint.

Optionally, the projection module 1046 is configured to: determine, according to the following formula, a point M(X,Y,Z) to which a point m(u,v) in the target image is mapped in a world coordinate system:

$sm(u,v)=PM(\ )$, where s is a shrinkage factor, P is the first projection matrix, and Z in M(X,Y,Z) is determined based on the depth map; and determine, according to the following formula, a point m'(u,v) to which the point M(X,Y,Z) in the world coordinate system is mapped on the imaging plane corresponding to the virtual viewpoint:

$sm'(u,v)=P_v M(X,Y,Z)$, where $P_v$ is the second projection matrix.

Optionally, the positioning module 1044 is configured to: decode the multi-channel video stream to obtain an image frame sequence corresponding to at least one channel of video stream; and perform face detection on at least one frame of image in the image frame sequence, then perform clustering on a face of a same person, and select an image including a front face from clustered images to obtain the image set of the target person.

Optionally, the apparatus 1040 further includes:
a determining module, configured to: determine, as the target person, a person specified by a user, or determine, as the target person, a person whose appearance frequency is higher than a preset frequency.

Optionally, the communications module 1042 is further configured to:
send the video stream in the target-person view mode to a user terminal in response to a mode switching request sent by the user terminal.

Figure 14:
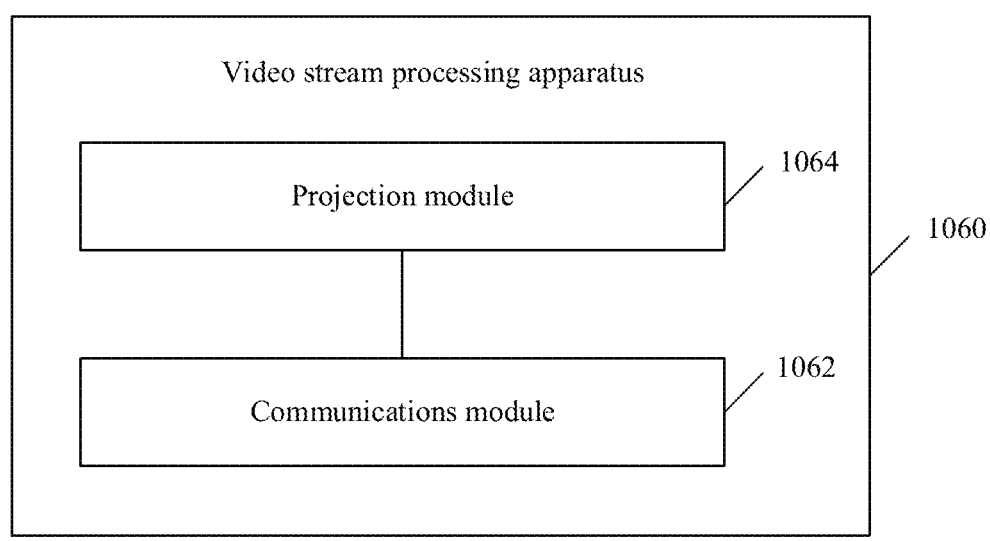
FIG. 14 is a diagram of a video stream processing apparatus according to this embodiment of this application.

An embodiment of this embodiment of this application further provides another video stream processing apparatus. FIG. 14 is a diagram of a video stream processing apparatus. The video stream processing apparatus 1060 includes:
a communications module 1062, configured to send a mode switching request to a server, where the mode switching request carries an identifier of a target person, and the target person is a person included in a multi-channel video stream obtained by shooting a same scene by a plurality of cameras, where
the communications module 1062 is further configured to receive a video stream that is in a target-person view mode and that is returned by the server, where the video stream in the target-person view mode is obtained by projecting, based on a depth map of a target image and a pose of a real viewpoint corresponding to the target image, the target image onto an imaging plane corresponding to a virtual viewpoint in the target-person view mode, the target image is an image that has an intersection with a vision field of the target person in the multi-channel video stream, the virtual viewpoint is determined based on at least one frame of image in an image set that is of the target person and that is obtained from the multi-channel video stream, and the at least one frame of image in the image set includes a front face of the target person; and a playing module 1064, configured to play the video stream in the target-person view mode.

Optionally, the communications module 1062 is further configured to:

receive a video stream that is in an associated-person view mode and that is returned by the server, where an associated person is a person that has an association relationship with the target person in the multi-channel video stream; and the playing module 1064 is configured to:

play the video stream in the target-person view mode and the video stream in the associated-person view mode.

Optionally, the apparatus 1060 further includes:

a generation module, configured to: generate the mode switching request in response to a mode switching operation triggered by a user by using a remote control device, or generate the mode switching request in response to a mode switching operation triggered by a user by touching or tapping a mode switching control, or generate the mode switching request in response to a mode switching operation triggered by a user by using a voice or a gesture.

Optionally, the apparatus 1060 further includes:

a display module, configured to display, in a video stream playing interface, a video synopsis that corresponds to the video stream in the target-person view mode and that is pushed by the server; and a generation module, configured to generate the mode switching request in response to a trigger operation performed on the video synopsis, to switch from a third-person view mode to the target-person view mode.

The video stream processing apparatus 1040 and the video stream processing apparatus 1060 according to embodiments of this embodiment of this application may correspondingly perform the methods in embodiments of this embodiment of this application. In addition, the foregoing and other operations and/or functions of the functional modules in the video stream processing apparatus 1040 are used to implement corresponding procedures of the methods in FIG. 2, and the foregoing and other operations and/or functions of the functional modules in the video stream processing apparatus 1060 are used to implement corresponding procedures of the methods in FIG. 11. For brevity, details are not described herein again.

It should be noted that the embodiments shown in FIG. 13 and FIG. 14 are merely example division of the video stream processing apparatus. In other embodiments of this application, the video stream processing apparatus 1040 and the video stream processing apparatus 1060 may also be divided into different functional modules. For example, some functional modules may be obtained through division or combined based on the embodiments shown in FIG. 13 and FIG. 14.

Figure 15:
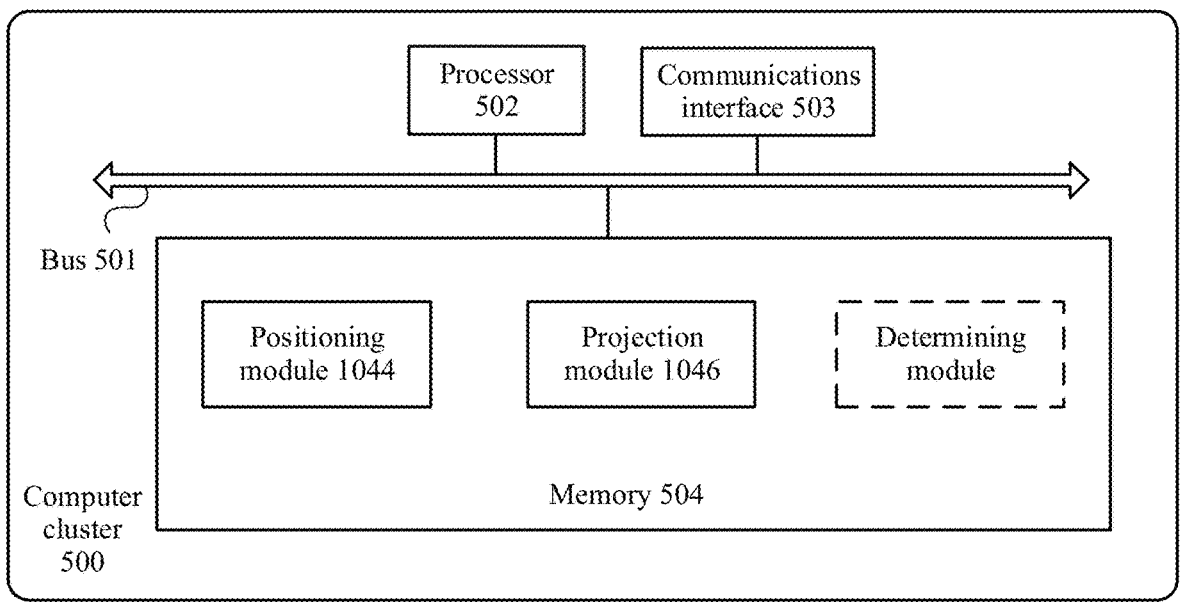
FIG. 15 is a diagram of a computer cluster according to this embodiment of this application.

It may be understood that the video stream processing apparatus shown in FIG. 13 may be deployed in a computer cluster. FIG. 15 provides a computer cluster. Descriptions are provided by using an example in which the computer cluster shown in FIG. 15 includes at least one computer. As shown in FIG. 15, the computer cluster 500 may be configured to implement functions of the video stream processing apparatus 104 in the embodiment shown in FIG. 11. The computer cluster 500 includes a bus 501, a processor 502, a communications interface 503, and a memory 504. The processor 502, the memory 504, and the communications interface 503 communicate with each other through the bus 501.

The bus 501 may be a peripheral component interconnect (PCI) bus, an extended industry standard architecture (EISA) bus, or the like. The bus may include an address bus, a data bus, a control bus, and the like. For ease of representation, only one thick line is used to represent the bus in FIG. 15, but this does not mean that there is only one bus or only one type of bus. The communications interface 503 is configured to communicate with the outside. For example, the communications interface 503 may receive a multi-channel video stream sent by the camera 102, or receive a mode switching request sent by the user terminal 106.

The processor 502 may be a central processing unit (CPU). The memory 504 may include a volatile memory, for example, a random access memory (RAM). Alternatively, the memory 504 may include a non-volatile memory, for example, a read-only memory (ROM), a flash memory, an HDD, or an SSD.

The memory 504 stores executable code, and the processor 502 executes the executable code to perform the foregoing video stream processing method. When the embodiment shown in FIG. 13 is implemented and the modules in the embodiment in FIG. 13 are implemented by using software, software or program code required for performing functions of the positioning module 1044, the projection module 1046, and the determining module in FIG. 13 is stored in the memory 504, functions of the communications module 1042 are implemented through the communications interface 503, and the processor is configured to execute instructions in the memory 504 to perform the video stream processing method applied to the video stream processing apparatus 1040.

It should be noted that in FIG. 15, descriptions are provided by using an example in which the computer cluster 500 including one computer implements functions of the video stream processing apparatus 1040. In another embodiment of this application, the functions of the video stream processing apparatus 1040 may also be implemented by a computer cluster including a plurality of computers.

In some embodiments, the computer cluster may include a plurality of computers, and each computer can implement all functions of the video stream processing apparatus 1040. The memory 504 of each computer in the computer cluster stores software or program code required for implementing functions of the positioning module 1044, the projection module 1046, and the determining module.

In other embodiments, the computer cluster may include a plurality of computers, at least one computer implements some functions of the video stream processing apparatus 1040, and the plurality of computers can implement all functions of the video stream processing apparatus 1040 through collaboration. In an example, there may be following several groups of computers in the computer cluster. A memory of one group of computers stores software or program code required for implementing functions of the positioning module 1044, a memory of another group of computers stores software or program code required for implementing functions of the projection module 1046, and a memory of another group of computers stores software or program code required for implementing functions of the determining module. In this way, all functions of the video stream processing apparatus 1040 are implemented by using the plurality of computers.

Figure 16:
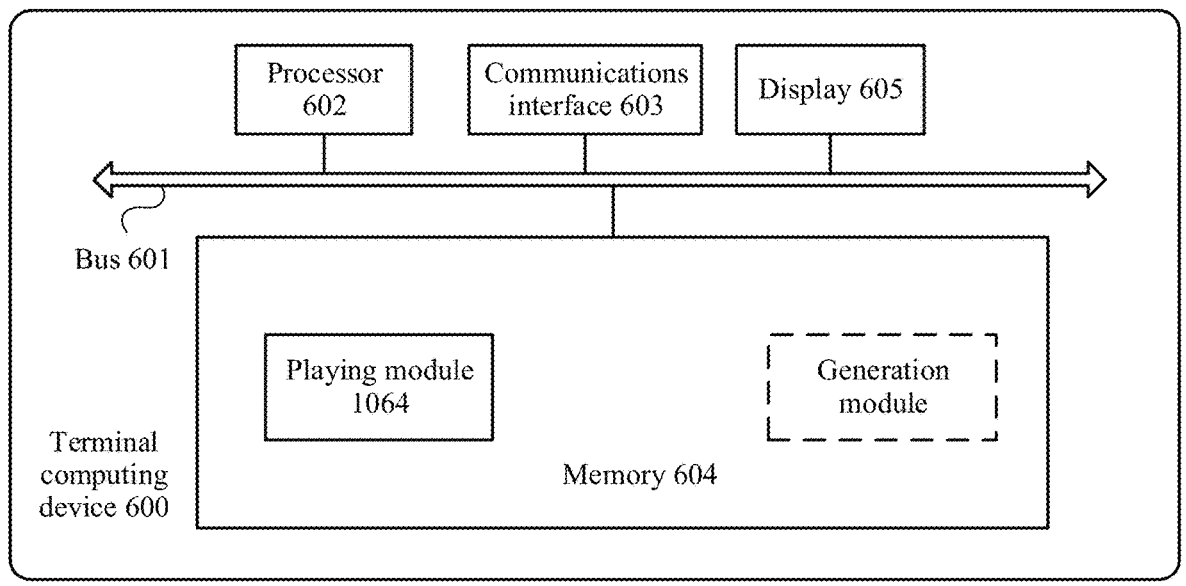
FIG. 16 is a diagram of a terminal computing device according to of this embodiment of this application.

The video stream processing apparatus shown in FIG. 14 may be deployed in a terminal computing device. The terminal computing device may be a user terminal such as a mobile phone, a computer, or a television. FIG. 16 provides a terminal computing device. The terminal computing device 600 includes a bus 601, a processor 602, a communications interface 603, a memory 604, and a display 605. The display 605 may be a liquid crystal display (LCD), an organic light-emitting display (OLED), or the like. The processor 602, the memory 604, the display 605, and the communications interface 603 communicate with each other through the bus 601.

When the terminal computing device 600 implements the embodiment shown in FIG. 14 and the modules in the embodiment in FIG. 14 are implemented by using software, software or program code required for performing functions of the playing module 1064 and the generation module in FIG. 14 is stored in the memory 604, functions of the communications module 1062 are implemented through the communications interface 603, and the processor is configured to execute instructions in the memory 604 to perform, by using the display 605, the method applied to the video stream processing apparatus 1060.

An embodiment of this embodiment of this application further provides a computer-readable storage medium, including instructions. When the instructions are run on a computer, the computer is enabled to perform the video stream processing method applied to the video stream processing apparatus 1040.

An embodiment of this embodiment of this application further provides a computer-readable storage medium, including instructions. When the instructions are run on a computer, the computer is enabled to perform the video stream processing method applied to the video stream processing apparatus 1060.

An embodiment of this embodiment of this application further provides a computer program product. When the computer program product is executed by a computer, the computer performs any one of the foregoing video stream processing methods. The computer program product may be a software installation package. If any one of the foregoing video stream processing methods needs to be used, the computer program product may be downloaded, and the computer program product may be executed on a computer.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected based on an actual requirement to achieve the objectives of the solutions of the embodiments. In addition, in the accompanying drawings of the apparatus embodiments provided in this embodiment of this application, connection relationships between modules indicate that the modules have communication connections with each other, which may be implemented as one or more communications buses or signal cables.

Based on the description of the foregoing implementations, a person skilled in the art may clearly understand that this application may be implemented by using software in combination with necessary universal hardware, or certainly, may be implemented by using dedicated hardware, including a dedicated integrated circuit, a dedicated CPU, a dedicated memory, a dedicated component, or the like. Usually, all functions completed by a computer program may be easily implemented by using corresponding hardware, and a hardware structure used to implement a same function may also be in various forms, for example, a form of an analog circuit, a digital circuit, or a dedicated circuit. However, for this application, software program implementation is a better implementation in most cases. Based on such an understanding, the technical solutions of the embodiments of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or some of the foregoing embodiments may be implemented by using software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a training device or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A video stream processing method, the method comprising:
   obtaining an image set of a target person from a multi-channel video stream, the multi-channel video stream being obtained for a same scene by a plurality of cameras, and an image in the image set comprises a front face of the target person;
   determining a virtual viewpoint in a target-person view mode based on the image in the image set; and
   projecting, based on a depth map of a target image and a pose of a real viewpoint corresponding to the target image, the target image onto an imaging plane corresponding to the virtual viewpoint to obtain a video stream in the target-person view mode, the target image intersecting with a vision field of the target person in the multi-channel video stream.

2. The method according to claim 1, wherein the determining the virtual viewpoint in the target-person view mode based on the image in the image set comprises:
performing face angle estimation and pupil location estimation on at least one frame of the image in the image set to determine angles of the virtual viewpoint in the target-person view mode, the angles being determined in a world coordinate system; and
determining a distance from the virtual viewpoint in the target-person view mode to an origin of the world coordinate system based on a depth map, the depth map corresponding to the at least one frame of the image.

3. The method according to claim 2, wherein the performing the pupil location estimation on the at least one frame comprises:
determining an eye area of the target person in the at least one frame through face alignment to obtain an eye image; and
performing the pupil location recognition on the eye image of the target person using a pre-trained deep neural network.

4. The method according to claim 1, wherein the projecting, based on the depth map of the target image and the pose of the real viewpoint corresponding to the target image, the target image onto the imaging plane corresponding to the virtual viewpoint comprises:
determining a first projection matrix based on the pose of the real viewpoint corresponding to the target image;
backprojecting the target image onto three-dimensional space based on the first projection matrix and the depth map of the target image;
determining a second projection matrix based on a pose of the virtual viewpoint; and
projecting, based on the second projection matrix, pixels in the three-dimensional space onto the imaging plane corresponding to the virtual viewpoint.

5. The method according to claim 4, wherein the backprojecting the target image onto the three-dimensional space based on the first projection matrix and the depth map of the target image comprises:
determining, according to the following formula, a point $M(X,Y,Z)$ to which a point $m(u,v)$ in the target image is mapped in a world coordinate system:
$sm(u,v)=PM(\ )$, wherein s is a shrinkage factor, P is the first projection matrix,
and Z in $M(X,Y,Z)$ is determined based on the depth map; and
the projecting, based on the second projection matrix, the pixels in the three-dimensional space onto the imaging plane corresponding to the virtual viewpoint comprises:
determining a point $m'(u,v)$ to which the point $M(X,Y,Z)$ in the world coordinate system is mapped on the imaging plane corresponding to the virtual viewpoint according to $sm'(u,v)=P_v M(X,Y,Z)$, wherein $P_v$ is the second projection matrix.

6. The method according to claim 1, wherein the obtaining the image set of the target person from the multi-channel video stream comprises:
decoding the multi-channel video stream to obtain an image frame sequence corresponding to at least one channel of the multi-channel video stream; and
performing face detection on at least one frame of the image in the image frame sequence, then performing clustering on a face of a same person and selecting an image comprising the front face from clustered images to obtain the image set of the target person.

7. The method according to claim 1, wherein the method further comprises:
determining, as the target person, a person specified by a user; or
determining, as the target person, a person whose appearance frequency is higher than a preset frequency.

8. The method according to claim 1, wherein the method further comprises:
sending the video stream in the target-person view mode to a user terminal in response to a mode switching request sent by the user terminal.

9. A video stream processing method, the method comprising:
sending a mode switching request to a server, the mode switching request carrying an identifier of a target person, the target person being in a multi-channel video stream, the multi-channel video stream being obtained for a same scene by a plurality of cameras;
receiving a video stream in a target-person view mode, the video stream being returned by the server, the video stream in the target-person view mode is obtained by projecting, based on a depth map of a target image and a pose of a real viewpoint corresponding to the target image, the target image onto an imaging plane corresponding to a virtual viewpoint in the target-person view mode, the target image intersecting with a vision field of the target person in the multi-channel video stream, the virtual viewpoint being determined based on at least one frame of the image in an image set of the target person, the image set being obtained from the multi-channel video stream, the at least one frame of the image in the image set comprises a front face of the target person; and
playing the video stream in the target-person view mode.

10. The method according to claim 9, wherein the method further comprises:
receiving a video stream in an associated-person view mode, the associated-person view mode being returned by the server, wherein an associated person has an association relationship with the target person in the multi-channel video stream; and
the playing the video stream in the target-person view mode comprises:
playing the video stream in the target-person view mode and the video stream in the associated-person view mode.

11. The method according to claim 9, wherein the method further comprises:
generating the mode switching request in response to a mode switching operation triggered by a user using a remote control device; or
generating the mode switching request in response to the mode switching operation triggered by the user touching or tapping a mode switching control; or
generating the mode switching request in response to the mode switching operation triggered by the user using a voice or a gesture.

12. The method according to claim 9, wherein the method further comprises:
displaying, in a video stream playing interface, a video synopsis that corresponds to the video stream in the target-person view mode, the video synopsis being pushed by the server; and generating the mode switching request in response to a trigger operation performed on the video synopsis, to switch from a third-person view mode to the target-person view mode.

13. A video stream processing apparatus, comprising:
a memory storing instructions; and
at least one processor in communication with the memory, the at least one processor configured, upon execution of the instructions, to perform the following steps:
obtaining an image set of a target person from a multi-channel video stream, the multi-channel video stream being obtained for a same scene by a plurality of cameras, and an image in the image set comprises a front face of the target person;
determining a virtual viewpoint in a target-person view mode based on the image in the image set; and
projecting, based on a depth map of a target image and a pose of a real viewpoint corresponding to the target image, the target image onto an imaging plane corresponding to the virtual viewpoint to obtain a video stream in the target-person view mode, the target image intersecting with a vision field of the target person in the multi-channel video stream.

14. The apparatus according to claim 13, wherein the at least one processor further executes the instructions to perform the steps:
performing face angle estimation and pupil location estimation on at least one frame of the image in the image set to determine angles of the virtual viewpoint in the target-person view mode, the angles being determined in a world coordinate system; and
determining a distance from the virtual viewpoint in the target-person view mode to an origin of the world coordinate system based on a depth map, the depth map corresponding to the at least one frame of the image.

15. The apparatus according to claim 14, wherein the at least one processor further executes the instructions to perform the steps:
determining an eye area of the target person in the at least one frame through face alignment to obtain an eye image; and
performing the pupil location recognition on the eye image of the target person using a pre-trained deep neural network.

16. The apparatus according to claim 13, wherein the at least one processor further executes the instructions to perform the steps:
determining a first projection matrix based on the pose of the real viewpoint corresponding to the target image;
backprojecting the target image onto three-dimensional space based on the first projection matrix and the depth map of the target image;
determining a second projection matrix based on a pose of the virtual viewpoint; and
projecting, based on the second projection matrix, pixels in the three-dimensional space onto the imaging plane corresponding to the virtual viewpoint.

17. The apparatus according to claim 16, wherein the at least one processor further executes the instructions to perform the steps:
determining, according to the following formula, a point M(X,Y,Z) to which a point m(u,v) in the target image is mapped in a world coordinate system:
sm(u, v)=PM( ), wherein s is a shrinkage factor, P is the first projection matrix, and Z in M(X,Y,Z) is determined based on the depth map; and
the projecting, based on the second projection matrix, the pixels in the three-dimensional space onto the imaging plane corresponding to the virtual viewpoint comprises:
determining a point m'(u,v) to which the point M(X,Y,Z) in the world coordinate system is mapped on the imaging plane corresponding to the virtual viewpoint according to sm'(u, v)=$P_v$M (X,Y,Z), wherein $P_v$ is the second projection matrix.

18. The apparatus according to claim 13, wherein the at least one processor further executes the instructions to perform the steps:
decoding the multi-channel video stream to obtain an image frame sequence corresponding to at least one channel of the multi-channel video stream; and
performing face detection on at least one frame of the image in the image frame sequence, then performing clustering on a face of a same person and selecting an image comprising the front face from clustered images to obtain the image set of the target person.

19. The apparatus according to claim 13, wherein the operations further comprising:
determining, as the target person, a person specified by a user; or
determining, as the target person, a person whose appearance frequency is higher than a preset frequency.

20. The apparatus according to claim 13, wherein the operations further comprising:
sending the video stream in the target-person view mode to a user terminal in response to a mode switching request sent by the user terminal.

21. A video stream processing apparatus, comprising:
a memory storing instructions; and
at least one processor in communication with the memory, the at least one processor configured, upon execution of the instructions, to perform the following steps:
sending a mode switching request to a server, wherein the mode switching request carrying an identifier of a target person, the target person being in a multi-channel video stream, the multi-channel video stream being obtained for a same scene by a plurality of cameras;
receiving a video stream in a target-person view mode, the video stream being returned by the server, the video stream in the target-person view mode is obtained by projecting, based on a depth map of a target image and a pose of a real viewpoint corresponding to the target image, the target image onto an imaging plane corresponding to a virtual viewpoint in the target-person view mode, the target image intersecting with a vision field of the target person in the multi-channel video stream, the virtual viewpoint being determined based on at least one frame of the image in an image set of the target person, the image set being obtained from the multi-channel video stream, the at least one frame of the image in the image set comprises a front face of the target person; and
playing the video stream in the target-person view mode.

22. The apparatus according to claim 21, wherein the operations further comprising:
receiving a video stream in an associated-person view mode, the associated-person view mode being returned by the server, wherein an associated person has an association relationship with the target person in the multi-channel video stream; and the playing the video stream in the target-person view mode comprises:

playing the video stream in the target-person view mode and the video stream in the associated-person view mode.

23. The apparatus according to claim 21, wherein the operations further comprising:

generating the mode switching request in response to a mode switching operation triggered by a user using a remote control device; or generating the mode switching request in response to the mode switching operation triggered by the user touching or tapping a mode switching control; or generating the mode switching request in response to the mode switching operation triggered by the user using a voice or a gesture.

24. The apparatus according to claim 21, wherein the operations further comprising:

displaying, in a video stream playing interface, a video synopsis that corresponds to the video stream in the target-person view mode, the video synopsis being pushed by the server; and generating the mode switching request in response to a trigger operation performed on the video synopsis, to switch from a third-person view mode to the target-person view mode.

* * * * *